March 10, 1970  T. F. MULLANEY  3,499,231
FAST AUTOMATIC INFRARED DRYING AND FUSING APPARATUS
FOR A HIGH MELT COATING ON AN EASILY
COMBUSTIBLE WEB
Filed June 23, 1964  23 Sheets-Sheet 6

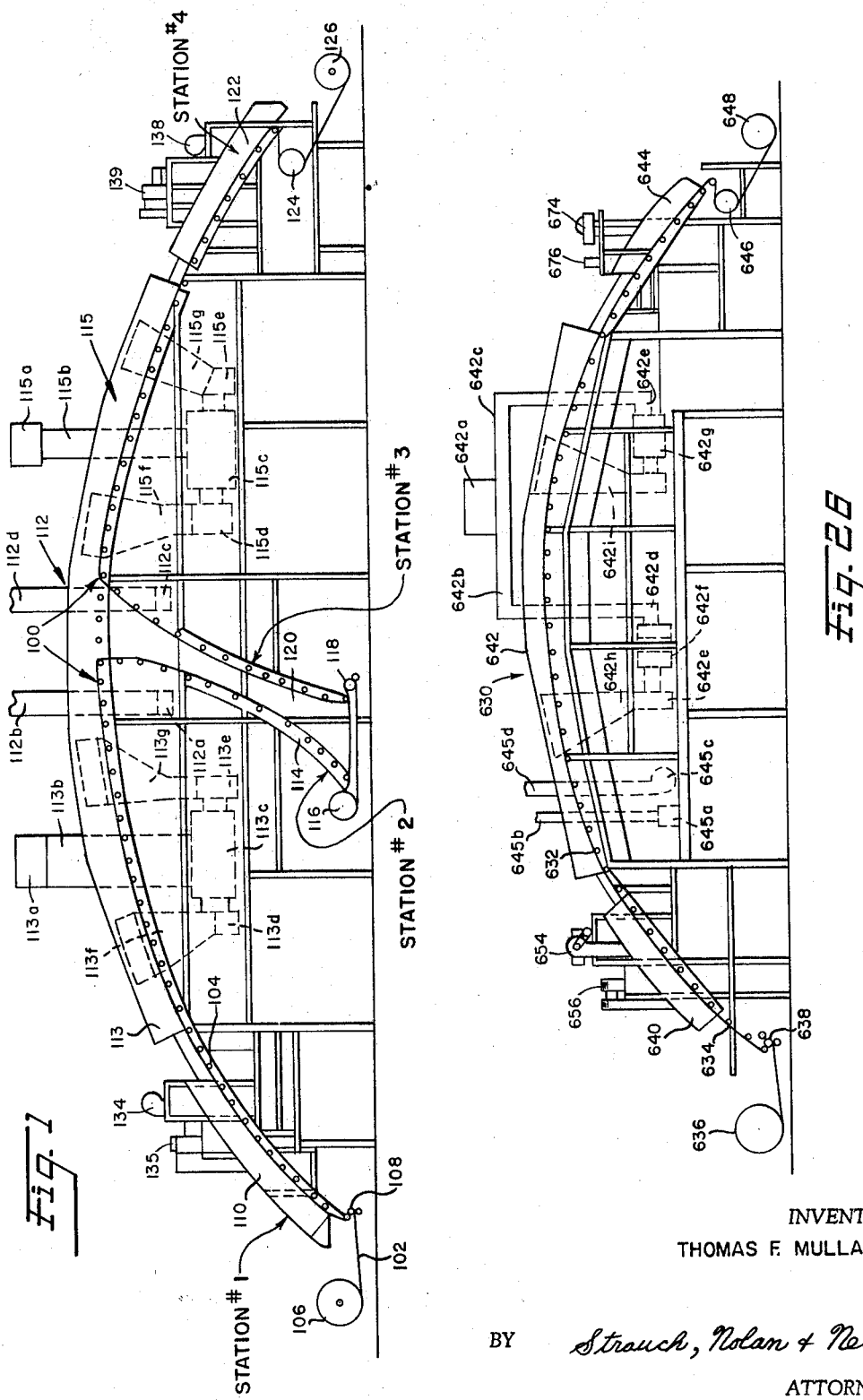

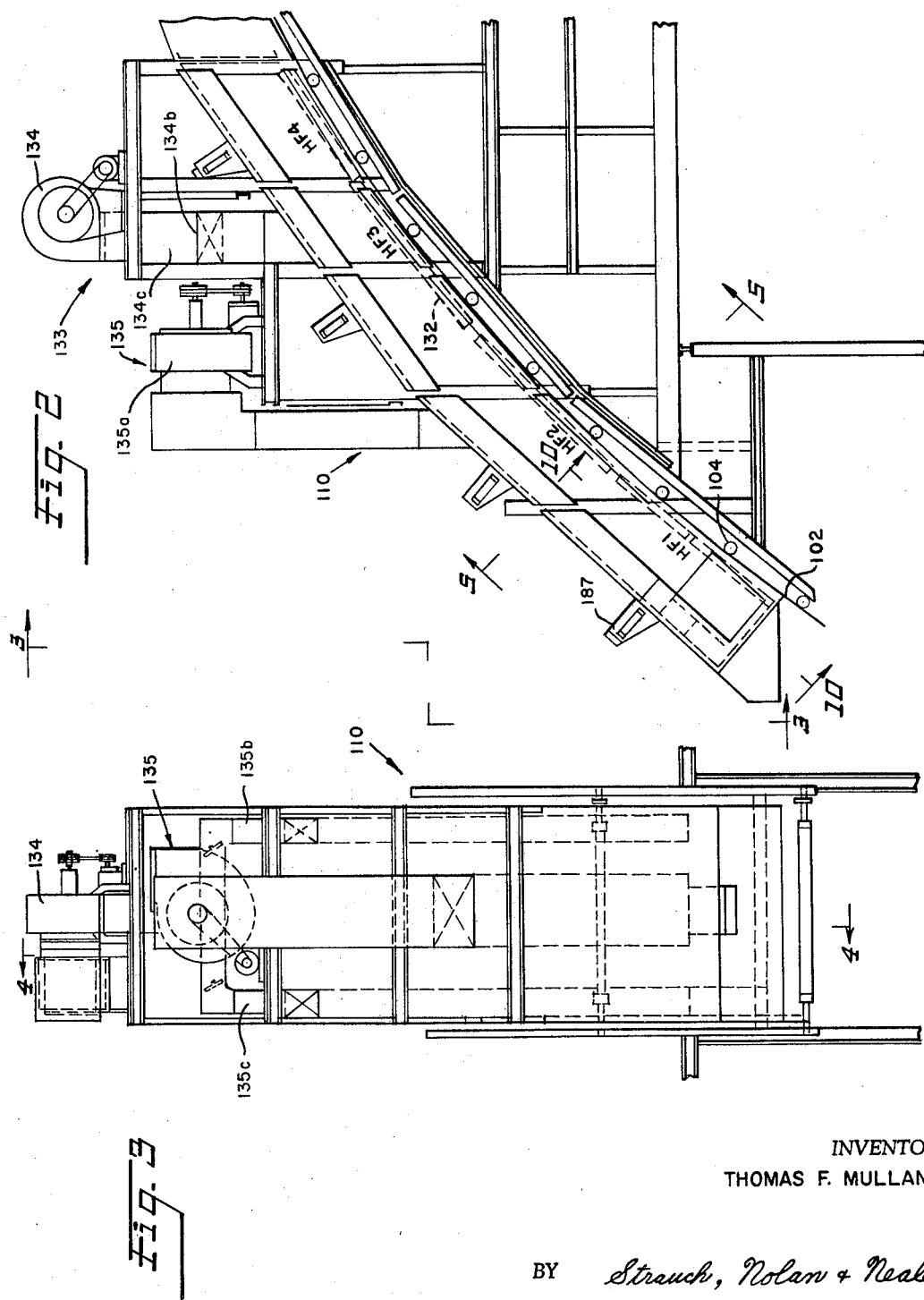

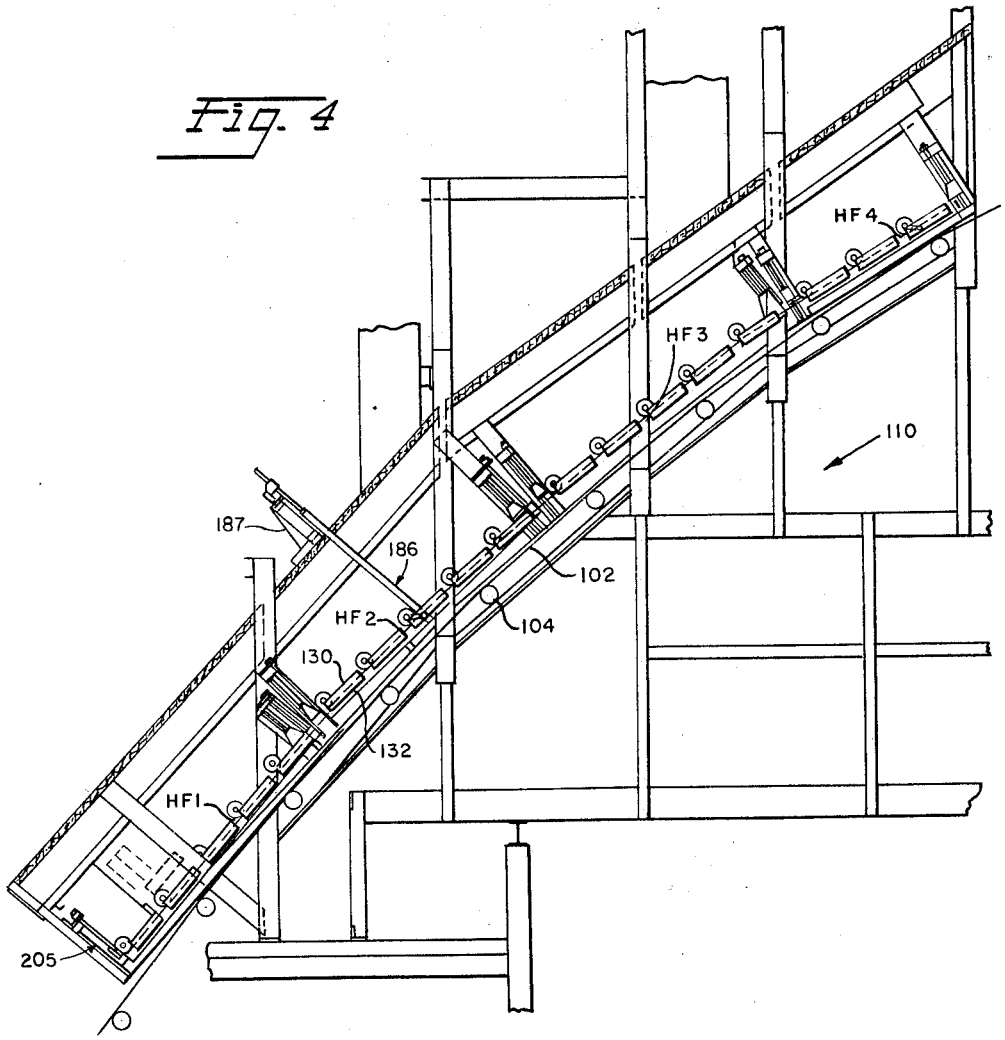

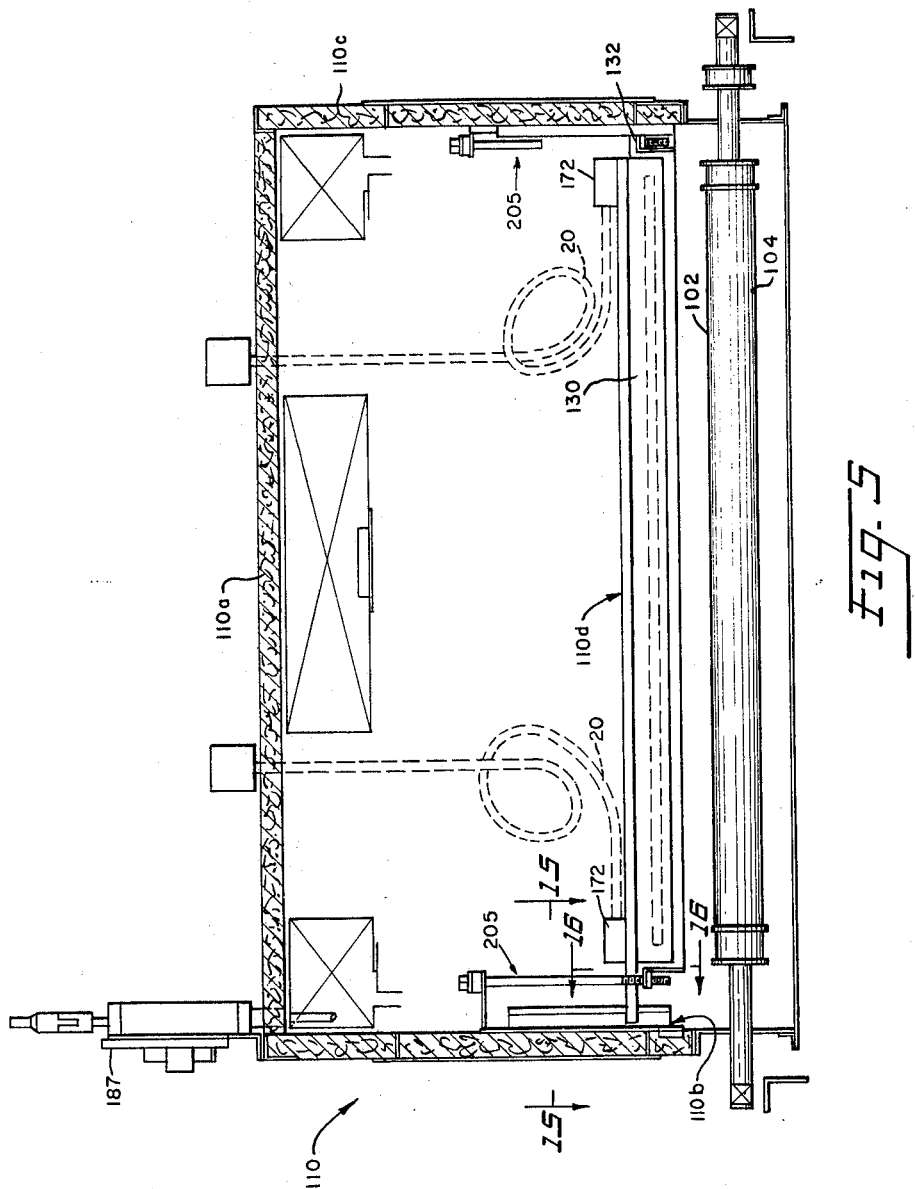

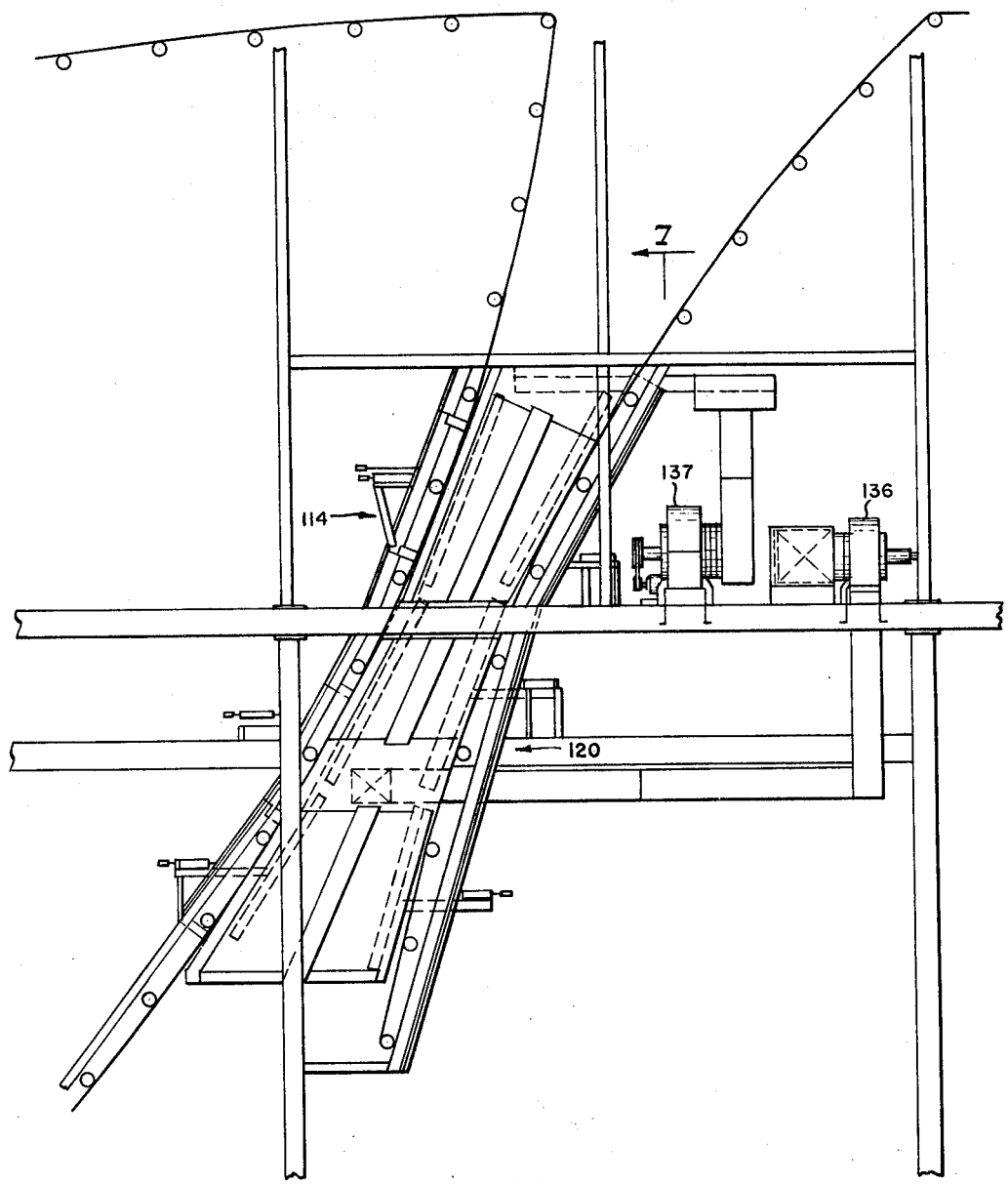

INVENTOR
THOMAS F. MULLANEY

Strauch, Nolan & Neale
ATTORNEYS

INVENTOR
THOMAS F. MULLANEY

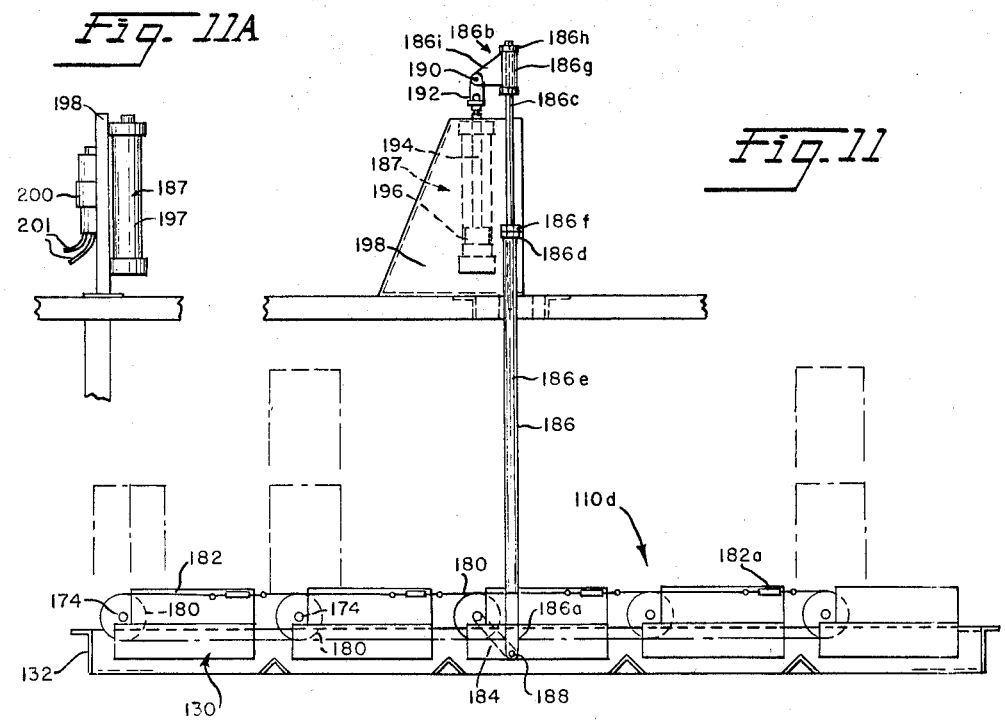
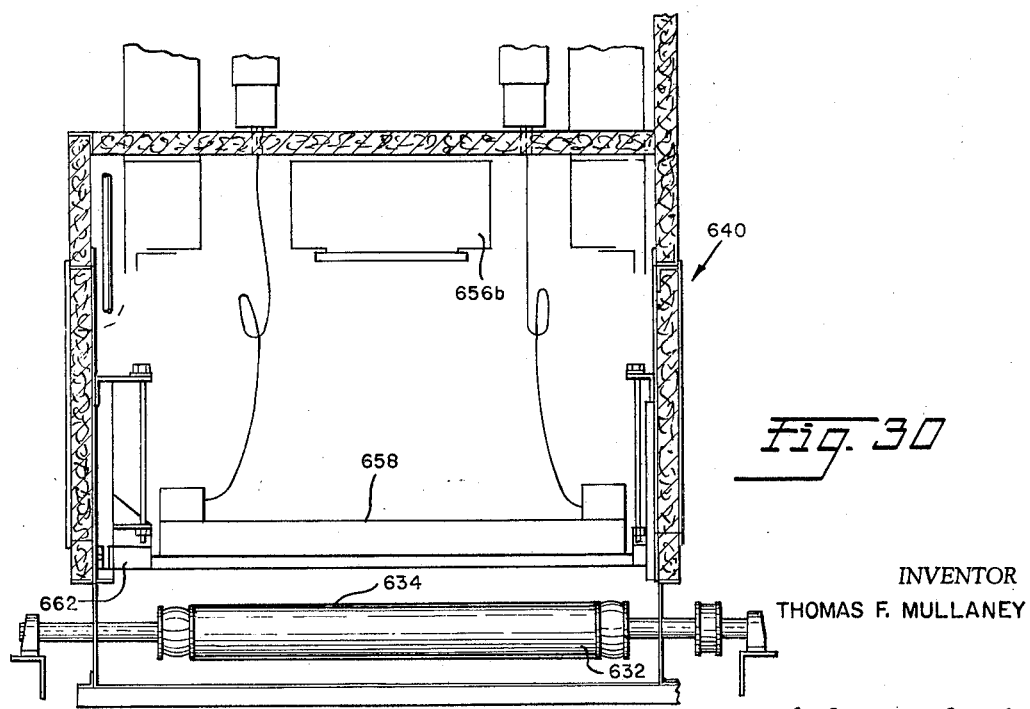

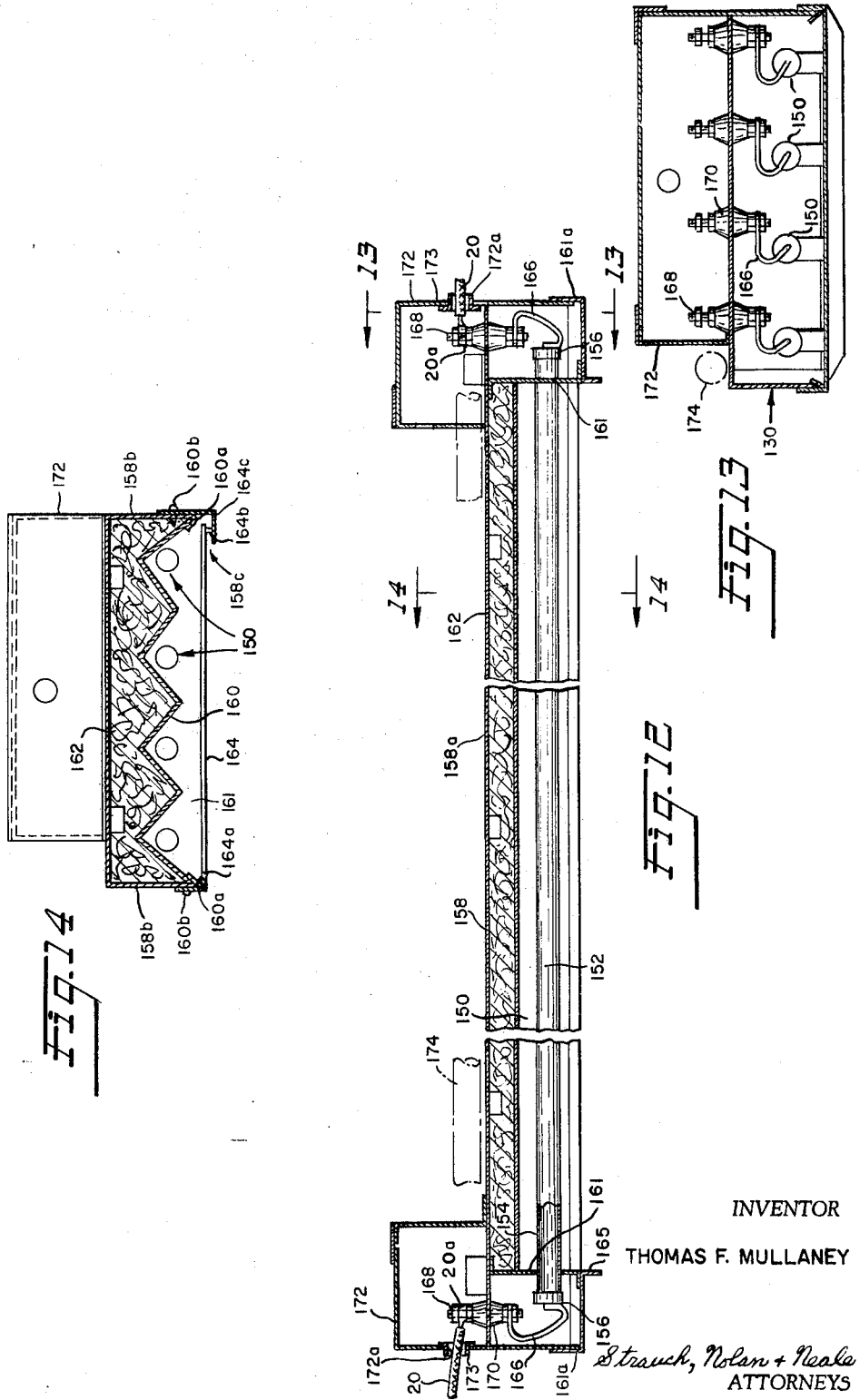

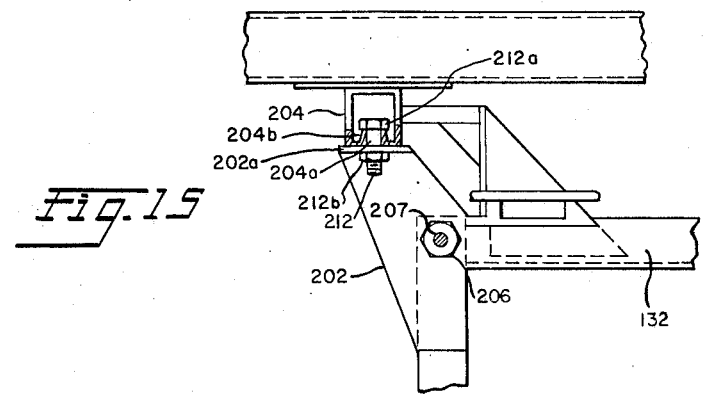
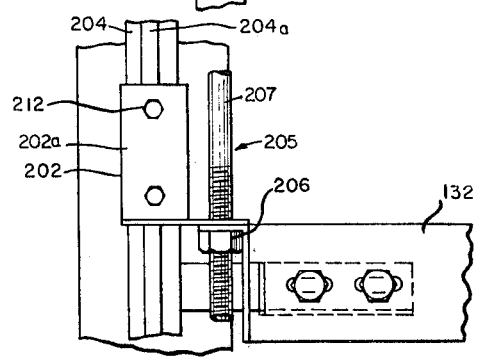
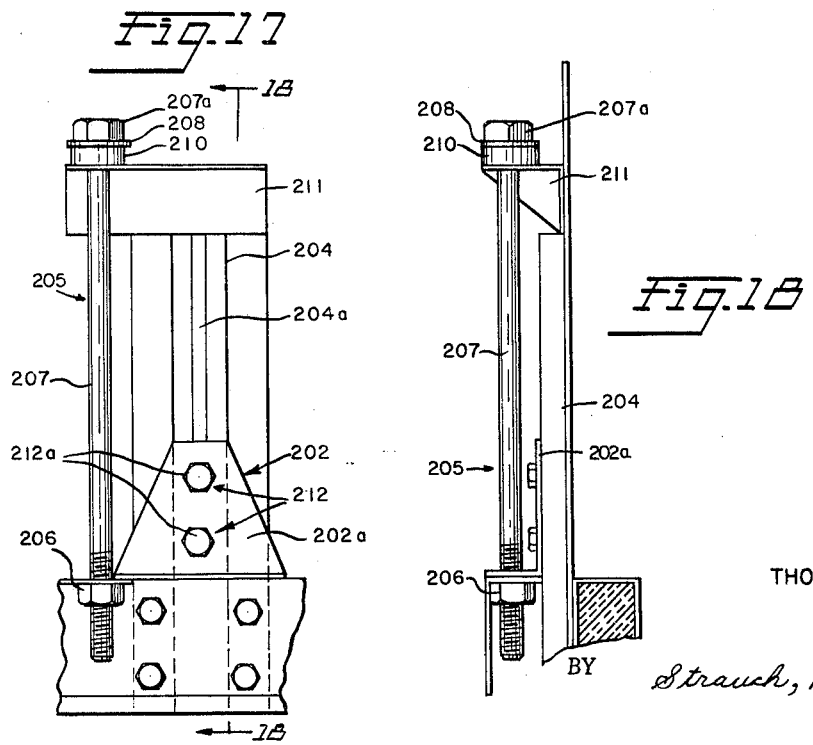
INVENTOR
THOMAS F. MULLANEY
BY Strauch, Nolan & Neale
ATTORNEYS

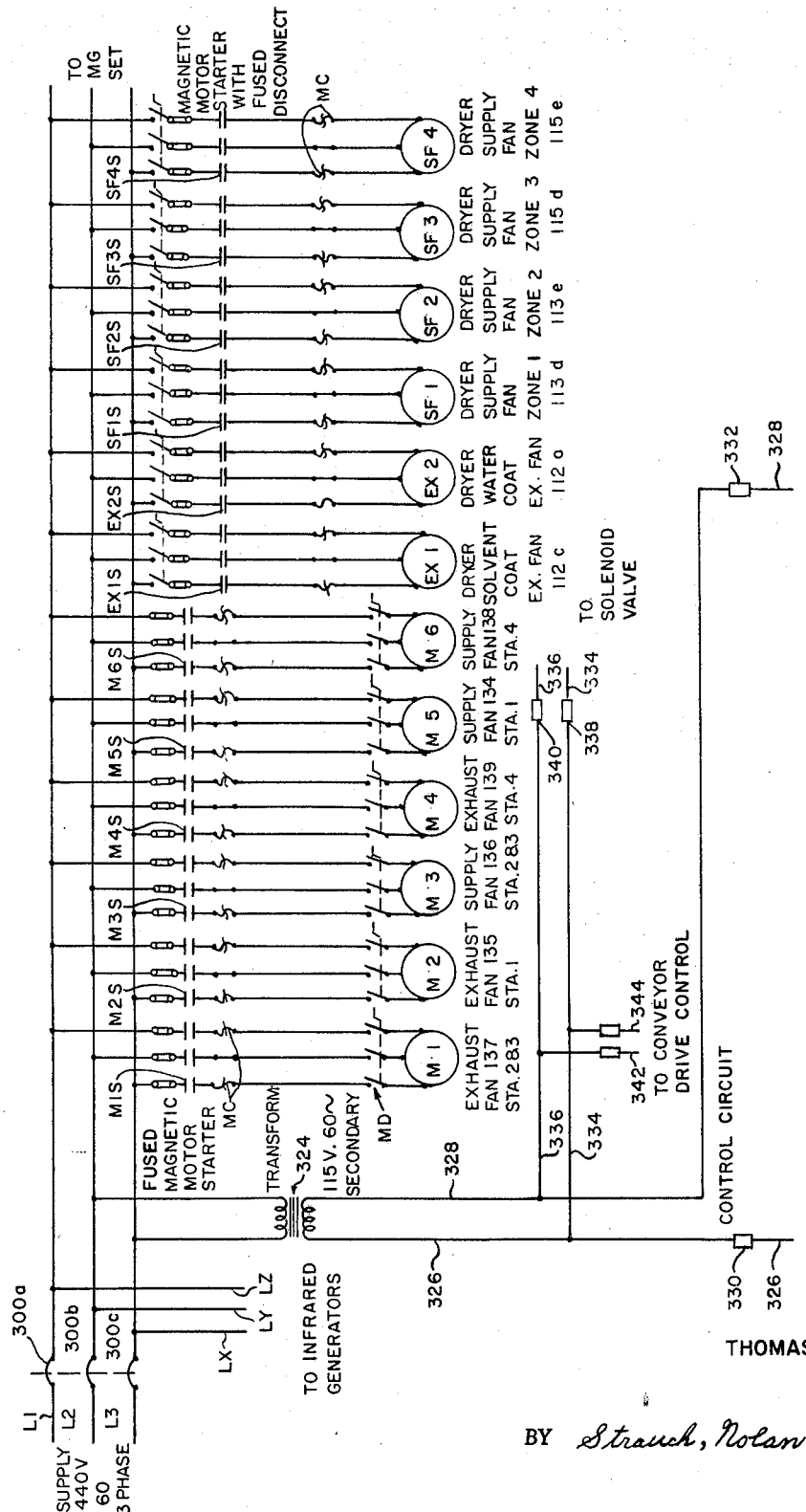

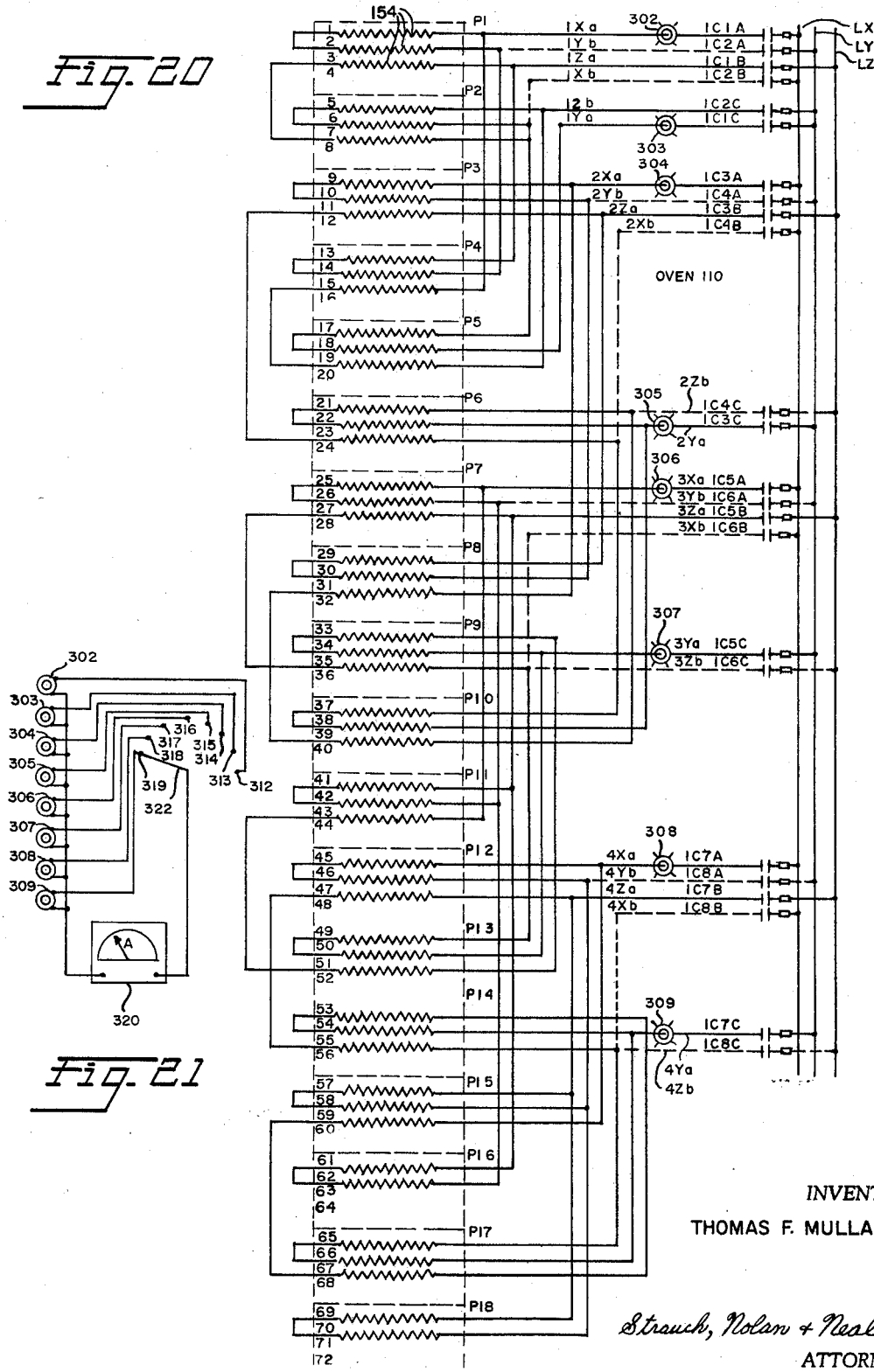

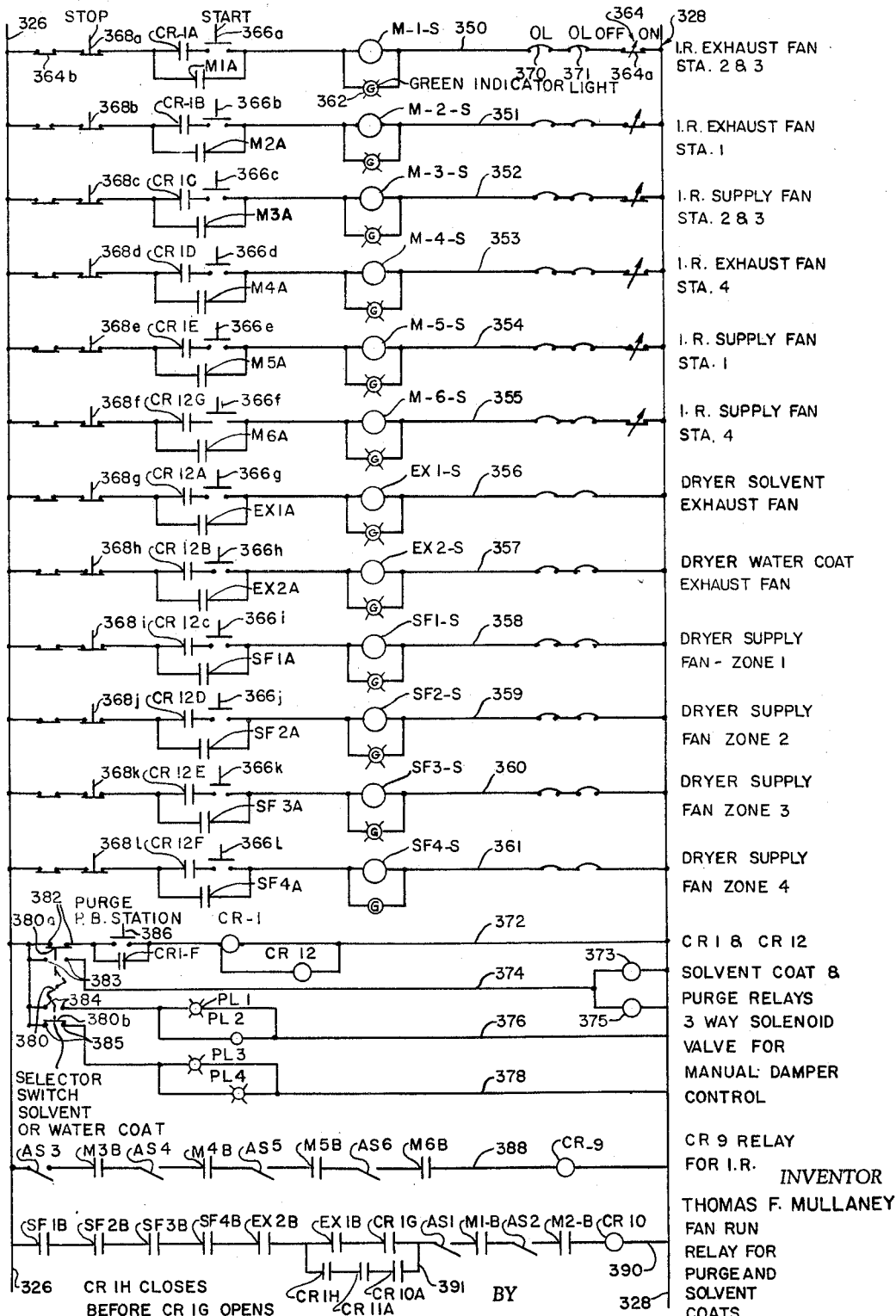

INVENTOR
THOMAS F. MULLANEY
BY
Strauch, Nolan & Neale
ATTORNEYS

March 10, 1970     T. F. MULLANEY     3,499,231
FAST AUTOMATIC INFRARED DRYING AND FUSING APPARATUS
FOR A HIGH MELT COATING ON AN EASILY
COMBUSTIBLE WEB
Filed June 23, 1964     23 Sheets-Sheet 19
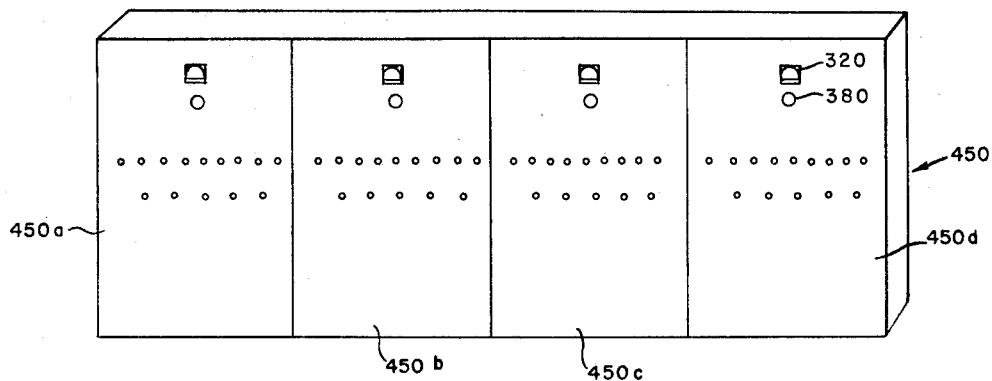
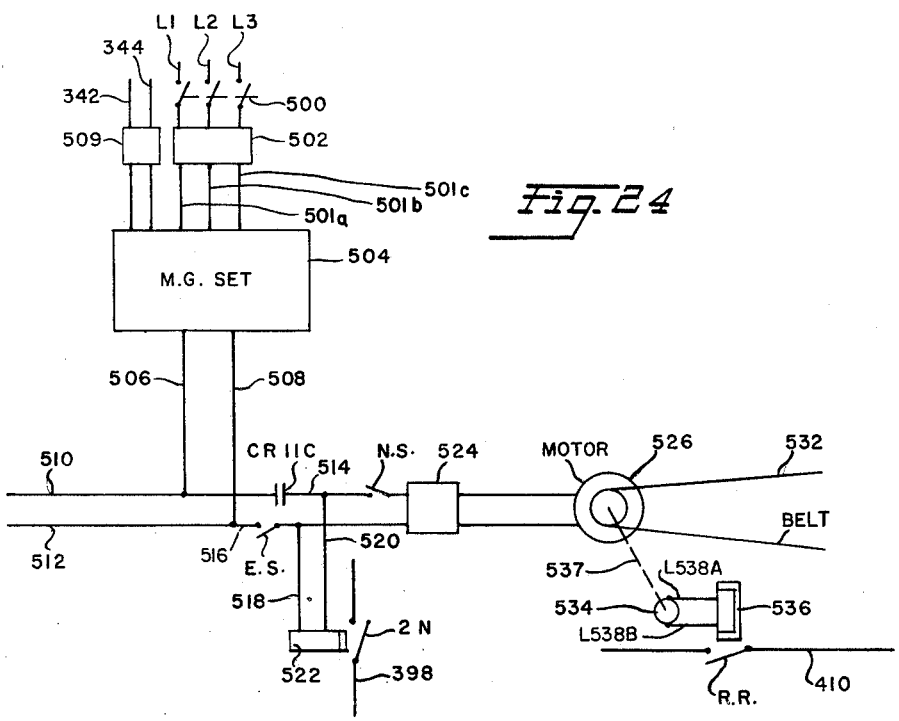
INVENTOR
THOMAS F. MULLANEY
BY Strauch, Nolan & Neale
ATTORNEYS

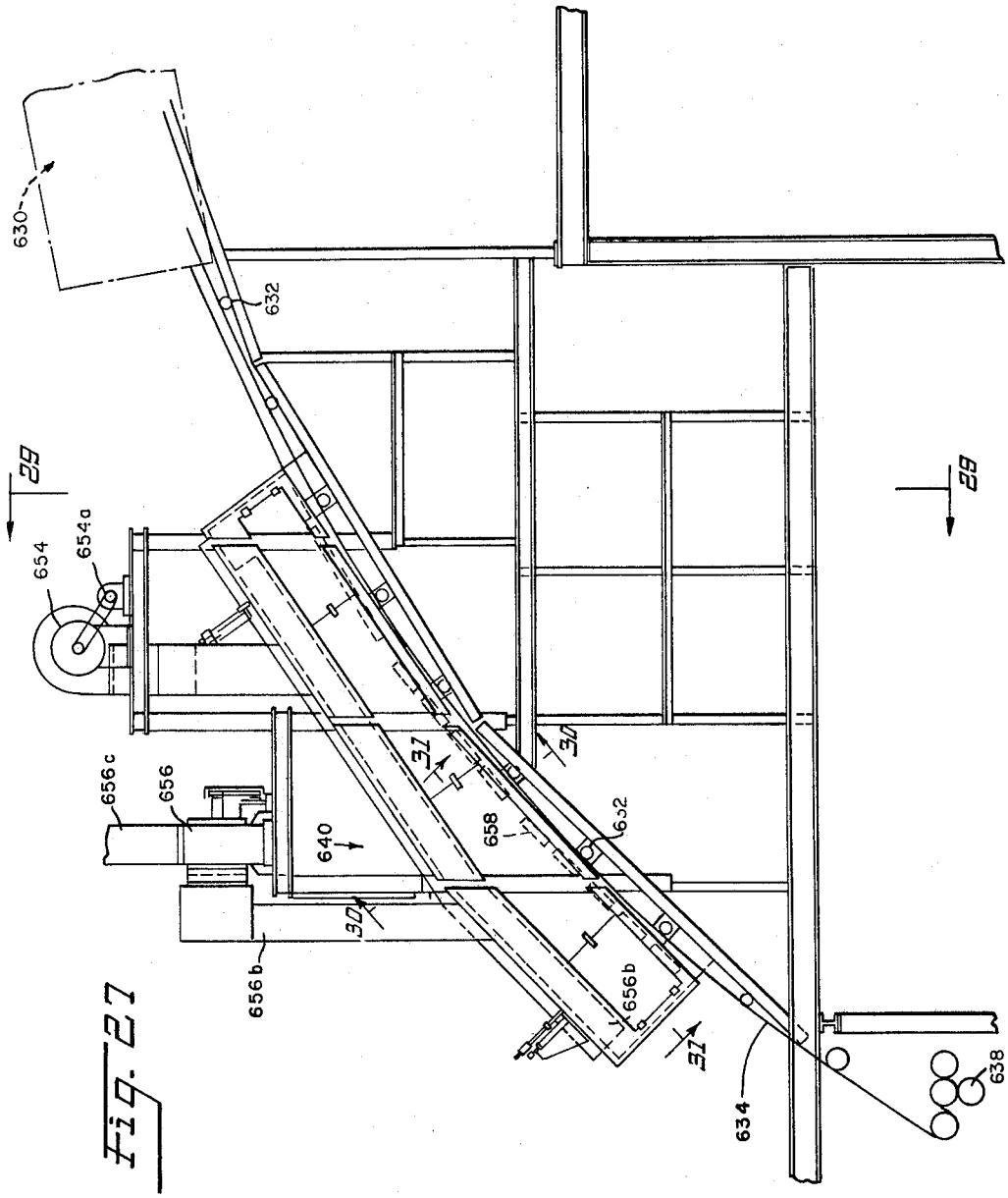

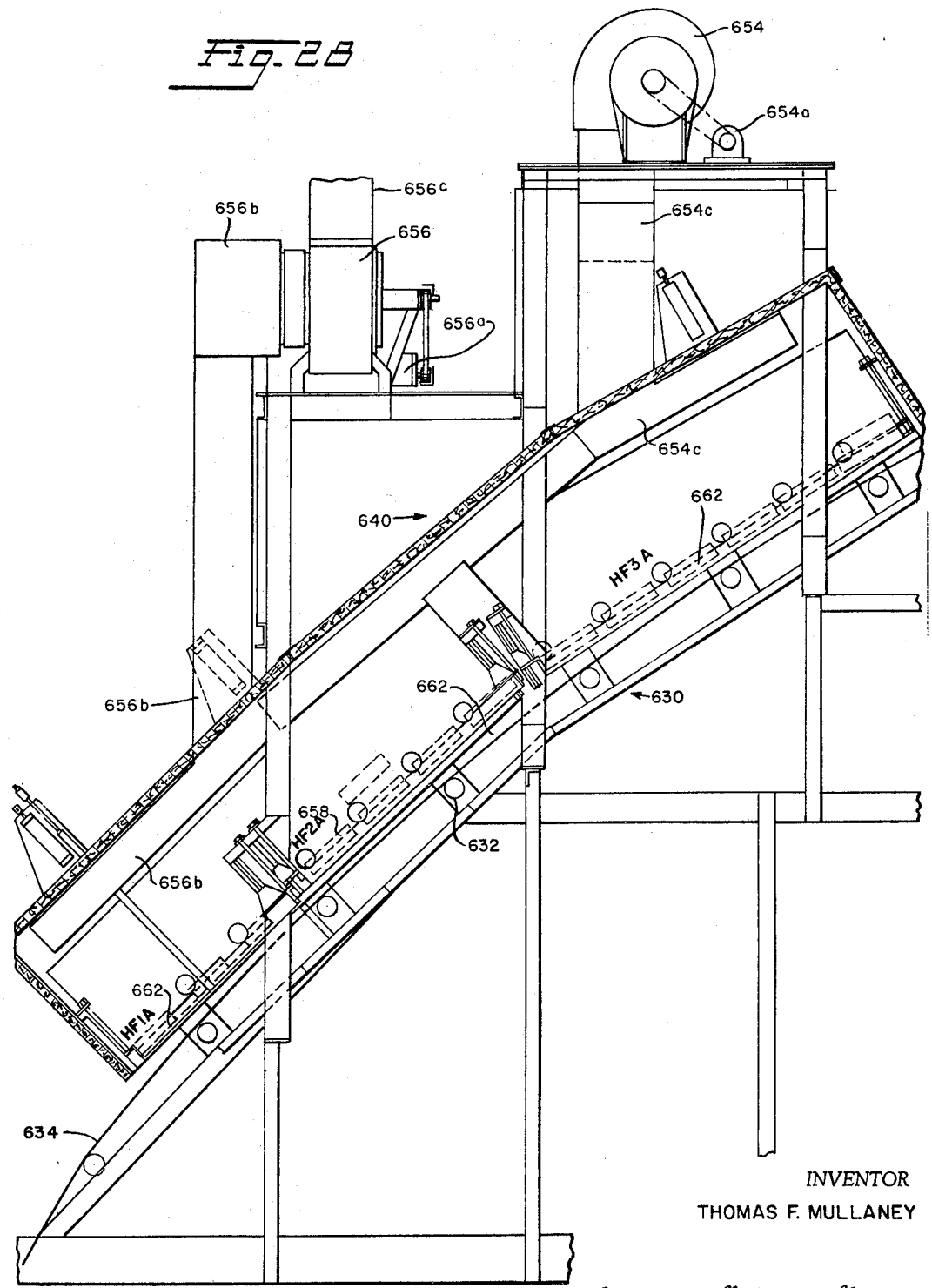

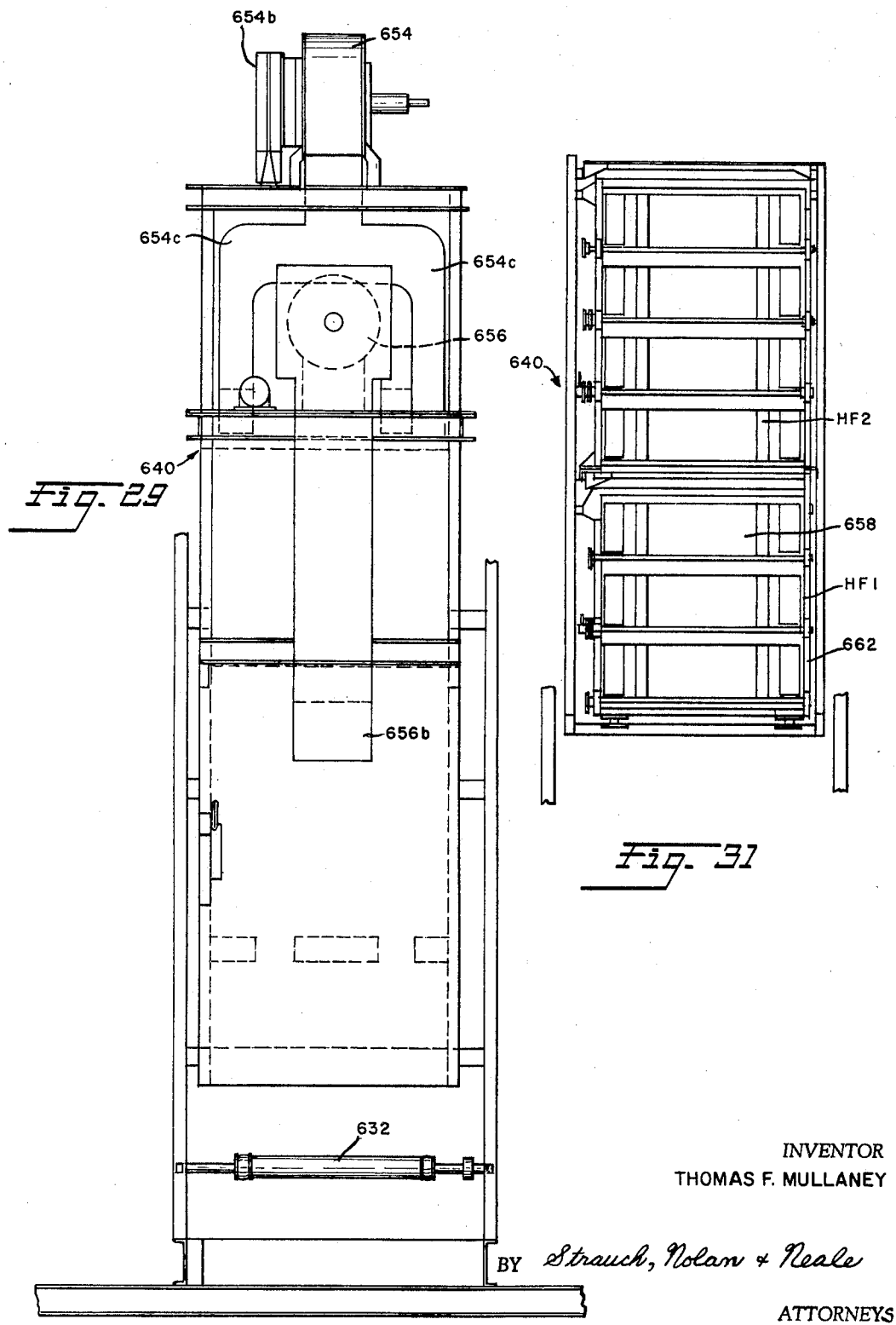

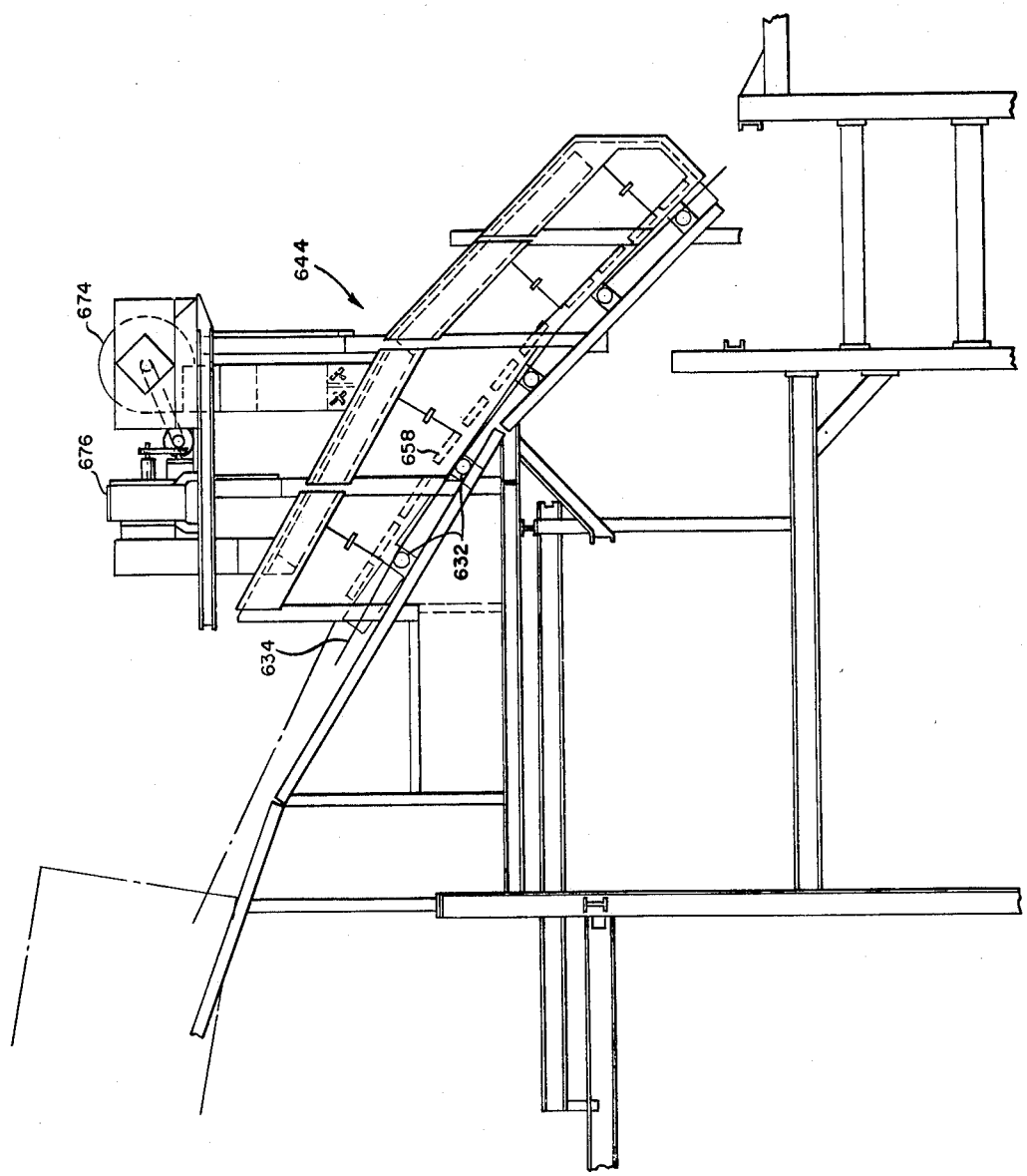

United States Patent Office 3,499,231
Patented Mar. 10, 1970

3,499,231
A FAST AUTOMATIC INFRARED DRYING AND FUSING APPARATUS FOR A HIGH MELT COATING ON AN EASILY COMBUSTIBLE WEB
Thomas F. Mullaney, Birmingham, Mich., assignor, by mesne assignments, to Fostoria-Fannon, Incorporated, a corporation of Ohio
Filed June 23, 1964, Ser. No. 377,279
Int. Cl. F26b 3/30, 13/08, 3/04
U.S. Cl. 34—48                                10 Claims

ABSTRACT OF THE DISCLOSURE

An apparatus for continuously applying at a high speed one or two successive polyvinylidene chloride coatings to a paper web comprising first drying the coating with infrared radiation, further drying it with hot air, then fusing the dried coating with infrared radiation and finally chilling the fused coating. Automatic means are provided responsive to (a) the speed of the web, (b) the temperature in the heating zones, and (c) the time, for controlling (1) the number of infrared heaters to be energized, and (2) to what degree, (3) the positions of these heaters with respect to the web, and (4) the exhaust air through each of the heating zones.

---

This invention relates to coating apparatus and methods, and more specifically, to apparatus and methods for fusing a coating of a thermoplastic material such as polyvinylidene chloride to the surface of a paper or other web. In particular, the present invention relates to coating apparatus and methods utilizing radiant and convective heating to dry a paper or other web to which a thermoplastic coating material has been applied in liquid form and employing relatively short wave length infrared radiation to subsequently fuse the dried coating and bond it to the web or to a previously applied coating without overheating the web.

The utilization of infrared radiation in accordance with the present invention to partially evaporate the liquid carrier of a dispersion of polyvinylidene chloride or similar material speeds the drying process without overheating the underlying web and permits the use of materially shorter convective drying ovens to complete the drying process than would otherwise be possible.

The fusing of a thermoplastic coating such as polyvinylidene chloride to a flammable base such as paper is difficult to accomplish since polyvinylidene chloride will not fuse until heated to a temperature to the range of 300° F. to 600° F., and most papers are damaged if heated to temperatures in this range. The heat damage problem is solved in accordance with the present invention by subjecting the previously dried thermoplastic coating to infrared radiation of short or intermediate wave length (preferably having a peak intensity in the wave length range of 2 to 6 microns) for a period of about two seconds and then cooling the web. Radiant heating of the predried coating for this short period will fuse the plastic and bond it to the underlying web without overheating the web.

A further problem solved by the present invention is that of making coating apparatus versatile enough to process a variety of paper and other webs and to accommodate a variety of coating methods and materials. For example, it may be necessary to design a single installation to handle paper webs of various grades and thicknesses and of different widths ranging up to the maximum the installation is designed to handle (a typical coating unit can handle webs up to a miximum of 62 inches wide). As a further example, the coating must, in some cases, be applied in two or more layers, the first layer being fused to the surface of the paper and the second layer being applied and fused to the first. The novel apparatus provided by the present invention is sufficiently versatile to accommodate these and numerous other coating techniques.

Further, it is advantageous to be able to use coating materials dissolved or dispersed in flammable liquids. Hence, the apparatus must be designed to operate without fire hazard when flammable liquids are used. This is accomplished in the present invention by locking out the infrared heaters and by purging the apparatus of flammable solvents after use of such materials before removing the interlock on the infrared heaters. The present invention therefore precludes the possibility of fire or explosion by misoperation of the apparatus during the various coating processes made possible by the present invention.

In their preferred form, the infrared ovens employed in the present invention include infrared panels each having a plurality of electric quartz tube type infrared generators surrounded by reflectors which direct the radiation emitted from the quartz lamps onto the coating on the base or web being treated. Further reflectors on the opposite side of the base from the heater panels direct radiation passing through the web back onto its uncoated surface to speed the drying or fusing process.

In the preferred embodiment of the present invention, the distance from the infrared generators to the paper is adjustable, the number and arrangement of the infrared generators operating at a given time can be controlled to provide any desired pattern of radiation, and burned out lamps can be replaced without shutting down the apparatus.

Another novel feature of the present invention is a novel mechanism which, in the event of a stoppage of or a break in the web or other emergency, instantly and automatically swings the infrared panels to a position where radiation is directed off the web and simultaneously cuts off the power to the infrared generators. In the preferred embodiment of the present invention this mechanism includes pneumatic motors for swinging the panels to a position at an angle of 90° to that in which they are normally disposed and control mechanism for controlling the supply of compressed air to the pneumatic motor.

Another important feature of the present invention is a control system which includes metering equipment for ascertaining the presence of burned out infrared generators and is so arranged that, when the coating apparatus is started up, full heat is not applied to the base or web until the latter attains its normal rate of movement through the apparatus.

In a typical application of the novel coating apparatus just described, the coating material is an aqueous dispersion of polyvinylidene chloride which is applied to one side of the base at a rate of 600 feet per minute by a conventional roll coater. The base then moves through stations in the coating apparatus, which sequentially: (a) remove part of the water with infrared radiation; (b) remove the balance of the moisture in a convection oven; (c) fuse the polyvinylidene chloride to the base by infrared radiation; (d) cool the base; and (e) rewind the coated base on a roll.

In the sequence of steps just described, a single co.t or layer of the coating material is deposited on and fused to the base. The principles of the present invention may, however, readily be embodied in coating apparatus for applying two or more coats or layers of coating material. Such apparatus may be similar to that for applying a single coat with the addition of stations for applying, drying, and fusing the second coating. The sequence of steps in applying a two coat polyvinylidene coating to a base is: (a) apply an aqueous dispersion of polyvinylidene chloride to the base; (b) remove part of the moisture in an infrared oven; (c) remove the balance of the moisture in a convection oven; (d) fuse the first coat to the base in an infrared oven; (e) cool the coated base on a chill roll; (f) apply a second coating of the aqueous dispersion of polyvinylidene chloride to the base; (g) remove part of the moisture in a second infrared oven; (h) remove the balance of the moisture in a second convection oven; (i) fuse the second coat in a second infrared fusing oven; (j) cool the base on a chill roll; and (k) rewind the web on a roll.

Coating apparatus designed to apply two coats in accordance with the principles of the present invention may be employed to apply a single coat by rewinding the coated web after the first coat has been fused and the web cooled. Such apparatus can also be used to apply a coating to both sides of the base by reversing or turning over the base as it passes from the first chill roll to the second coating station. Coating apparatus in accordance with the present invention capable of applying an even larger number of coats or layers can be readily produced, if desired, by adding stations for applying, drying, and fusing each additional coat or layer.

As will be apparent from the foregoing, the objects of the present invention include:

(1) The provision of novel improved coating apparatus and methods including means and steps for:

(a) Rapidly removing water from a coating material applied as an aqueous dispersion to a paper or other web;

(b) Bonding a predried thermoplastic or other fusible coating to a paper or other heat sensitive web without overheating the web;

(c) Bonding plural layers of a fusible material to a paper or other web;

(d) Utilizing direct heating by infrared generators to predry the coating and to fuse the coating to the surface of a web or to a previously applied coating;

(e) Utilizing electric infrared generators to supply the correct amount of radiation in a range of wave lengths effective to accomplish the preceding objects with high efficiency and without heat damage to paper or other heat sensitive webs; and (f) Utilizing infrared generators and novel controls for regulating the operation of the infrared generators to fit the varying conditions encountered in employing various coating materials and techniques in the apparatus.

(2) The provision of novel improved coating apparatus for applying and fusing to paper and other webs both coating materials in the form of aqueous dispersions and those dissolved in flammable solvents including radiant heaters, oven ventilating systems for evaporating and exhausting volatile flammable solvents, and interlocks preventing use of the radiant heaters when flammable solvents are present in the coating material.

(3) The provision of novel improved coating apparatus having:

(a) Prewired assemblies which facilitate installation, reduce cost, and prevent errors in connecting the components;

(b) Improved radiant ovens with heating units arranged to supply correct amounts of heat at various points along the ovens;

(c) Novel safeguards to prevent operation hazards;

(d) Ventilating means for removing water vapor laden air and replacing it with fresh air, for cooling the apparatus to prevent overheating, and for purging the apparatus of flammable vapors or liquids prior to its operation;

(e) Electric infrared generators and novel means for instantly cutting off the generators in an emergency such as an accidental stoppage of the machine or breakage of the web;

(f) Improved radiant ovens with electric infrared generators and spare generator units which can be connected into the circuit without shutting down the operation in case a generator burns out, additional heat is required, or it becomes necessary to change the heat distribution pattern;

(g) Novel metering equipment for checking the current flowing through the infrared generator circuits to determine if an infrared generator has burned out;

(h) Improved radiant ovens with means for adjusting the distance between the radiant heating elements and the paper;

(i) Heating means arranged to instantly direct the heat away from the web in emergencies such as stoppage of the web being coated;

(j) Improved controls for assuring the correct sequence of operations during start-up; and (k) Novel means for starting operation at low heat to prevent damage to the web prior to the time it attains its full operating speed and solenoid-controlled pneumatic motors for turning individual heating units toward the paper in a timed sequence on start-up and for immediately turning all units away from the web when the apparatus is stopped.

(4) The provision of coating apparatus and methods in accord with any of the preceding objects capable of producing coatings including two or more coats or layers of the coating material.

Additional objects and advantages and further novel features of the present invention will become apparent from the appended claims and as the ensuing detailed description and discussion proceeds in conjunction with the accompanying drawing, in which:

FIGURE 1 is a diagrammatic longitudinal section through one form of coating apparatus constructed in accordance with the principles of the present invention;

FIGURE 2 is a side view of an infrared predrying oven employed in the coating apparatus of FIGURE 1;

FIGURE 3 is a left end view of the predrying oven of FIGURE 2 looking in the direction of arrows 3—3 of FIGURE 2;

FIGURE 4 is a longitudinal section through the predrying oven taken substantially on line 4—4 of FIGURE 3;

FIGURE 5 is a transverse section of the predrying oven taken substantially on line 5—5 of FIGURE 2;

FIGURE 6 is a side view of an infrared fusing oven and a second infrared predrying oven employed in the coating apparatus of FIGURE 1;

FIGURE 11 is a side view of the frame and panels looking in the direction of arrows 11—11 of FIGURE 10;

FIGURE 11A is a partial left end view of the pneumatic motor shown in FIGURE 11;

FIGURE 12 is a section through one of the heater panels taken substantially along line 12—12 of FIGURE 10;

FIGURE 13 is a section through one of the heater panels taken substantially along line 13—13 of FIGURE 12;

FIGURE 14 is a section through one of the heater panels taken substantially along line 14—14 of FIGURE 12;

FIGURE 15 is a fragmentary section of a heater frame corner support taken substantially along a plane exemplarily represented in relation to the particular heater frame illustrated in FIGURE 5 by the line 15—15;

FIGURE 16 is a fragmentary section of the frame support taken substantially along line 16—16 of FIGURE 5;

FIGURE 17 is a fragmentary section similar in nature to FIGURE 16 of a frame support at a diagonally opposite corner of the heater frame;

FIGURE 18 is a fragmentary section of the heater frame taken substantially along line 18—18 of FIGURE 17;

FIGURE 19 is a schematic wiring diagram of the power circuits for the motors of the supply and exhaust blowers employed in the coating apparatus of FIGURE 1;

FIGURE 20 is a schematic wiring diagram of the power circuits for the infrared heaters of the predrying oven of FIGURE 2;

FIGURE 21 is a schematic wiring diagram of a circuit tester incorporated in the oven of FIGURE 2 to ascertain if an infrared heater is burned out;

Figure 23:
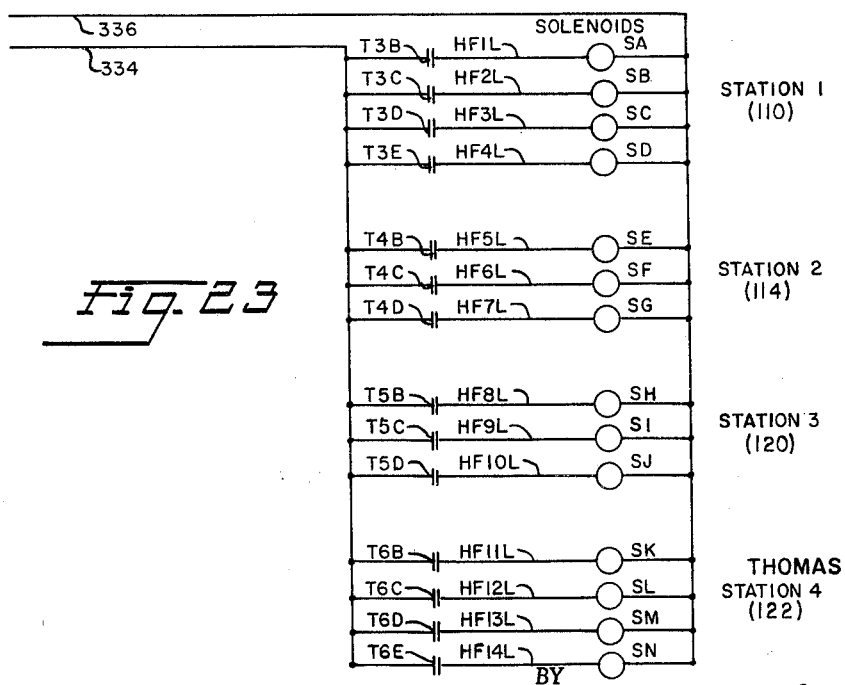

FIGURES 22A, 22B, 22C, and 22D taken together constitute a schematic wiring diagram of the control circuit for the oven of FIGURE 2;

FIGURE 23 is a schematic wiring diagram of the circuits controlling the pneumatic motors provided for rotating the infrared panels of the infrared predrying oven of FIGURE 2;

FIGURE 24 is a schematic diagram of the circuitry controlling the web drive mechanism of the coating apparatus of FIGURE 1;

FIGURE 25 is a perspective view of a control panel in which the control circuitry is housed;

FIGURE 26 is a diagrammatic longitudinal section through a second form of coating apparatus constructed in accord with the principles of the present invention;

FIGURE 27 is a side view of the infrared predrying oven employed in the coating apparatus of FIGURE 26;

FIGURE 28 is an enlarged scale longitudinal side view of the oven shown in FIGURE 27;

FIGURE 29 is an end view of the oven of FIGURE 26 looking in the direction of arrows 29—29 of FIGURE 27;

FIGURE 30 is a transverse section through the oven of FIGURE 26 taken substantially along line 30—30 of FIGURE 27;

FIGURE 31 is a longitudinal section through the oven of FIGURE 26 taken substantially along line 31—31 of FIGURE 27; and FIGURE 32 is a side view of an infrared fusing apparatus employed in the coating apparatus of FIGURE 26.

GENERAL

Referring now to the drawings, FIGURE 1 diagrammatically illustrates "two-coat" coating apparatus constructed in accordance with the principles of the invention and including an arched line 100 through which a web 102 of paper or material to be coated is conveyed on rollers 104 driven by a motor 526 (see FIGURE 24) in any suitable manner. Web 102 will normally arrive at the coating apparatus in the form of a roll (identified by reference character 106 in FIGURE 1) which may be supported on any desired type of roll stand.

Web 102 is drawn from roll 106 through a coating station 108 where a water dispersion of polyvinylidene chloride is applied to the upper side of web 102. Any suitable coating apparatus may be employed at this station; and, as the details of the apparatus are not critical in the practice of the present invention and as suitable apparatus is available from a number of commercial sources, it is not believed necessary to illustrate or describe this apparatus in detail.

In one exemplary application of the present invention, a paper web 62 inches wide is fed through the coating apparatus at a rate of 600 feet per minute; and 1440 pounds per hour of a dispersion consisting of equal parts of polyvinylidene chloride and water is applied to the web as it passes through coating station 108.

From coating station 108, the web 102 passes seriatim through infrared predrying oven 110 (station 1), through a first drying section or chamber 113 of a convection drying oven 112 and infrared fusing oven 114 (station 2) and over a chill roll 116. In infrared predrying oven 110, which web 102 enters at a temperature of 75° F., 20% of the water added to the web at coating station 108 is evaporated. Convection oven 112, which is preferably maintained at a temperature not above 200° F., evaporates the remainder of the water in which the polyvinylidene chloride was dispersed from the web.

Infrared fusing oven 114 is employed to fuse the polyvinylidene chloride and bond it to web 102. In oven 114, web 102 is exposed to short to intermediate wave length radiant energy (preferably having a peak intensity in the range of 2 to 6 microns) for about two seconds. This is an important feature of the present invention since this short exposure of the web to short to intermediate wave length radiant energy fuses the polyvinylidene chloride and bonds it to web 102 without overheating the underlying paper.

The chill roll 116 over which web 102 passes as it leaves infrared fusing oven 114 hardens the polyvinylidene chloride, minimizing the possibility of the coating being marred and making the coating web easier to handle. Chill rolls are well known items which are commercially available from several sources, and any desired roll of this type may be employed in the practice of the present invention.

As indicated above, the coating apparatus illustrated in FIGURE 1 is designed to apply two coats of the coating material to web 102. To apply the second coat, the coating apparatus is provided with a second coating station 118, a second infrared predrying oven 120 (station 3), a second infrared fusing oven 122 (station 4), a second chill roll 124, and convection over 112 is provided with a second drying section or chamber 115. Each of these coating apparatus components may be substantially identical to its counterpart, described above, for applying and fusing the first coat of the coating material to web 102.

The second coat of polyvinylidene chloride is applied and fused to the underlying coat in the same manner that the first coat is applied and fused to web 102. Specifically, web 102 passes from chill roll 116 into coating station 118 where a dispersion of equal parts of polyvinylidene chloride and water is applied to web 102 on top of the first coat at a rate of 720 pounds per hour. Web 102 then passes through the second infrared predrying over 120 where 20% of the water added to the web (72 pounds per hour is evaporated) and then through the second section 115 of convection drying oven 112 where the remainder of the water added to web 102 is coating station 118 is evaporated.

From drying oven section 115, web 102 passes through infrared fusing oven 122, where the second coat of polyvinylidene chloride is fused and bonded to the first coat, and over chill roll 124 to harden the coating.

Web 102 then moves to a rewind station of any desired construction where the coated web 102 is wound into a roll 126. The details of the rewind station are neither part of nor critical in the practice of the present invention and will therefore not be described herein.

OVEN STRUCTURES

As discussed above, the present invention employs an infrared predrying oven 110 to remove from web 102 a substantial portion of the water added to it at coating station 108. Both the concept of employing an infrared predrying oven and the particular predrying oven disclosed herein are important features of the present invention. The use of an infrared predrying oven both speeds the drying process and makes it possible to use a much shorter convection oven, thereby materially reducing the expense and space requirements of the coating apparatus. The advantages of the particular predrying oven construction employed in the practice of the present invention will be apparent from the following detailed description of oven 110.

Referring now to FIGURES 2–5, infrared predrying oven 110 includes a casing 110a composed of a structural framework 110b to which three inch thick insulated panels 110c are attached in any desired manner to form top, side and end walls which end walls are slotted to permit passage of web 102 through the oven.

Predrying oven 110 is provided with a ventilating system indicated generally by reference character 133 to remove from the oven the 144 pounds of water evaporated from web 102 in this oven each hour. As is shown best in FIGURES 2–4, ventilating system 133 includes a supply blower 134 and an exhaust blower 135. Supply blower 134 is connected to oven 110 through a filter 134b by air supply ducts 134c. Exhaust fan 135 is driven by a motor 135a and exhaust moisture laden air from oven 110 through exhaust ducts 135b and 135c connected, respectively, to the inlet and the outlet of the exhaust fan. In the illustrated embodiment of the present invention, supply fan 134 has a capacity of 4000 c.f.m. and exhaust fan 135 has a capacity of 7500 c.f.m., the extra capacity of the exhaust fan being necessary to handle the water vapor evaporated from web 102 as it passes through oven 110.

Located in predrying oven 110 is an infrared heating unit identified generally by reference character 110d and composed of 18 heater panels 130 mounted in four heater frames 132 (also identified as HF1–HF4), which support the heater panels closely adjacent the path of web 102 through oven 110 and are adjustable to vary the distance between the web and the heater panels. Five heater panels 130 are mounted in frame HF1, five in frame HF2, five in frame HF3, and three in frame HF4.

Referring next to FIGURES 12–14, each of the heater panels 130 includes a casing 158 in which four quartz lamp infrared generators 150 are arranged in spaced, parallel, side-by-side relationship. With heater panels 130 in their normal operating position, infrared generators 150 are parallel to the upper surface of web 102 and normal to its direction of movement and span the width of the web.

Each of the infrared generators 150 comprises a quartz tube or envelope 152 surrounding an elongated resistance element 154 of nichrome or the like and metal terminal caps 156 which fit over the ends of the quartz tube and are electrically connected to the opposite ends of resistance element 154. Quartz lamps as just described are commercially available from various sources and their operation is well known. Specifically, when the resistance element of connected across a source of electrical potenteian, it is heated to incandescence, causing it to emit radiant energy which is absorbed by the quartz envelopes which, in turn, emit radiant energy of a short to intermediate wave length which can be varied by altering the operating temperature of the lamp. In accord with the present invention, lamps 150 are preferably so operated that they will emit radiant energy having a peak intensity in the range of 2 to 6 microns.

Infrared generators 150 are supported from casing 158 by brackets 165 as is best shown in FIGURE 12. Brackets 165 are disposed at the ends of the infrared generators 150 and may be of any desired configuration in which the brackets do not contact the adjacent terminal caps 156 as this would short the quartz lamps.

A relatively stiff member 166 fabricated of a highly conductive metal such as copper is brazed to each terminal cap 156 at one end and is connected, at its other end, to a terminal screw 168. As is best shown in FIGURE 12, each terminal screw extends from adjacent the associated terminal cap 156 upwardly through the top wall 158a of casing 158 and is surrounded by an insulating bushing 170 which supports the screw and insulates it from the casing. Screws 168 and conductors 166 center quartz lamps 150 with respect to supporting brackets 165 and electrically connect their resistance elements 154 to flexible electrical conductors or lead-in wires 20 which connect the quartz lamps 150 to a source of operating voltage.

As is best shown in FIGURE 12, lead-in wires 20 are provided with conventional connectors 20a by which they are connected to terminal screws 168 and extend from the screws through apertures 172a in boxlike covers 172 which consist of expanded metal partially surrounded by a sheet metal frame and are attached to the upper wall 158a of casing 158. Covers 172 surround and protect terminal screws 168 against accidental contact by foreign objects. The expanded metal permits cooling air to be circulated into contact with terminal caps 156 of quartz lamps 150 to prevent the terminal caps and the connections thereto from overheating. Bushings 173 in apertures 172a surround lead-in wires 20 and protect their insulation from damage by the sharp edges of the cover.

In addition to quartz lamps 150, each heater panel 130 includes a top and side reflector 160 and two end reflectors 161, one at each edge of the panel. Reflector 160 is fabricated from sheet metal formed by right angle bends to a zig-zag shape and is mounted in casing 158 above and in uniformly spaced relation to the four infrared generators 150 by V-shaped brackets 160a which are attached to the side walls 158b of casing 158 by screws 160b. As shown in FIGURE 14, the adjacent triangularly sectioned convolutions of reflector 160 surround the top and sides of adjacent quartz lamps 150 and form the radiant energy emitted from the lamps into a beam generally perpendicular to the open lower face 158c of casing 158 and to the upper surface of web 102.

Reflectors 160 are insulated from heater panel casing 158 by fiberglass or other suitable material identified in FIGURE 14 by reference character 162.

End reflectors 161 are also formed from sheet metal and are fixed to casing top wall 158a as by track welding. As shown in FIGURE 12, reflectors 161 extend downwardly from casing top wall 158a adjacent the ends of reflector 160 so that the end portions of quartz lamps 150 extend through reflectors 161. Sheet metal covers 161a tack welded to reflectors 161 and to the covers 172 described above cooperate with the reflectors 161 and covers 172 to surround the end portions of quartz lamps 150 and protect them, terminal caps 156, and conductors 166 from damage.

The remaining, intermediate portions of quartz lamps 150 are protected from damage by a wire guard 164 extending across the open bottom face 158c of casing 158. Guard 164 is fixed to one casing side wall 158b by hinges 164a. A latch 164b fixed to the opposite casing side wall 158b by screw 164c normally retains guard 164 in the position illustrated in FIGURE 14, but permits it to be swung down when necessary to clean or change lamps 150. The screening from which guard 164 is fabricated is preferably of fairly open mesh so that it will not absorb more than an insignificant proportion of the radiant energy emitted by lamps 150.

Figure 10:
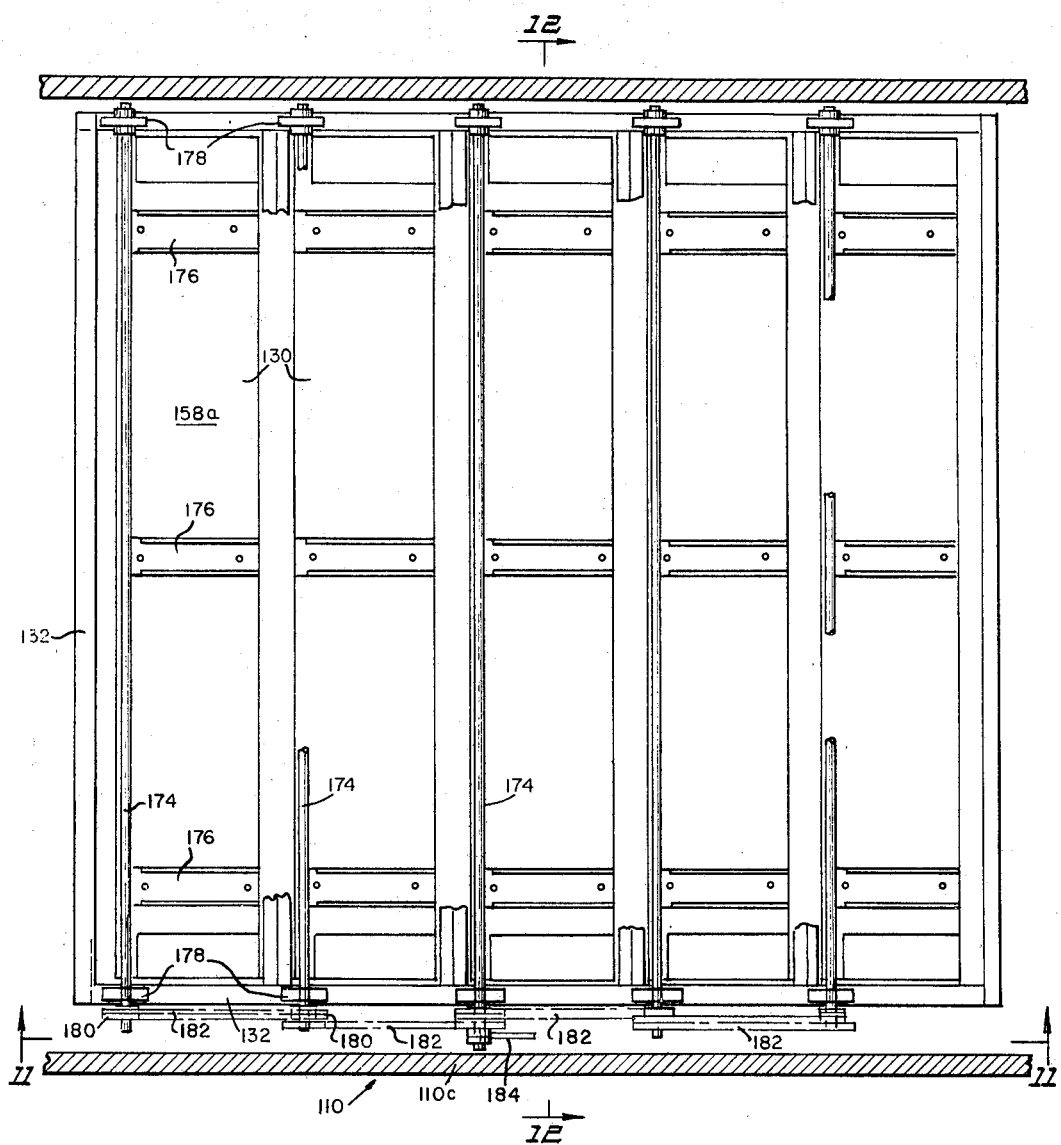
FIGURE 10 is an inclined longitudinal section through the predrying oven of FIGURE 2 showing the back of a frame of infrared heater panels employed in the predrying oven and is taken substantially along line 10—10 of FIGURE 2.

As mentioned above, groups of the heater panels 130 just described (varying in number from three to five) are mounted on each of four adjustable heater frames 132. Referring now specifically to FIGURE 10, the heater panel mounting arrangement includes a plurality of (three in the illustrated embodiment) panel supporting channels 176 riveted to the upper wall 158a of each panel's casing 158. As shown in FIGURE 12, the panels are relatively long and narrow and channels 176 extend laterally of casings 158 (i.e., normal to the major dimensions of the panels). Fixed to the three mounting channels 176 of each panel 130 adjacent one edge of casing 158 as by welding is a longitudinally extending panel supporting shaft 174. The ends of the panel supporting shafts 174 are rotatably journalled in pillow blocks 178 bolted to opposite sides of the panel supporting frame 132.

As will be apparent from the foregoing, heater panels 130 are pivotably supported on heater frames 132. This is an important feature of the present invention since it permits the panels to be swung away from their normal operating positions so that the radiant energy emitted by quartz lamps 150 will be directed away from web 102 in the event of a web stoppage or other emergency, preventing the web from being overheated and possibly ignited.

The mechanism for pivoting panels 130 from their normal positions in which the radiant energy emitted from lamps 150 is projected directly onto web 102 includes sprockets 180 fixed to the ends of the panel supporting shafts 174 at one side of each of the heater frames 132. As shown in FIGURE 10, a single sprocket 180 is fixed to the shaft 174 of each of the two outer heater panels 130, and two sprockets 180 are fixed, side-by-side, to the shafts 174 associated with each of the intermediate heater panels 130. Sprockets 180 are driven by conventional roller chains 182 which drivingly connect adjacent shafts 174. As shown in FIGURE 10, each of the intermediate shafts is drivingly connected to the shaft 174 on both sides of it, and the outer shafts are connected to the intermediate shafts. Therefore, all of the shafts 174 of the panels 130 mounted in a given heater frame 132 rotate in unison, maintaining heater panels 130 parallel when the shafts 174 are rotated to pivot them away from their normal disposition with their open faces parallel to web 102. This prevents jamming or other interference between panels as they rotate to their alternate positions.

As shown in FIGURE 11, a turn buckle 182a is incorporated in each of the drive chains 182. Turn buckles 182a permit the length of chains 182 to be properly adjusted so that they will properly drive sprockets 180 without binding.

Referring now to FIGURES 10 and 11, the central one of the shafts 174 has a crank 184 attached to it adjacent sprockets 180 as by brazing. With heater panels 130 in their normal, operative positions, the arm of crank 184 extends downwardly at an angle of approximately 45° to the horizontal. Attached to the free end of crank 184 is a connecting rod 186. A pin 188 extending through aligned apertures in a clevis 186a, fixed to the lower end of connecting rod 186, and through a hole in and adjacent the free end of crank 184 effects a pivotable connection between the crank and connecting rod.

As shown best in FIGURE 11, connecting rod 186 is fabricated from a threaded rod 186c extending into a tube 186e with a nut 186d welded to its upper end. By rotating rod 186c in nut 186d, the rod can be moved up and down relative to tube 186e. A lock nut 186f is provided to retain rod 186c in the position to which it is adjusted. The foregoing adjustment permits the length of connecting rod 186 to be adjusted to vary the distance between crank 184 and a pneumatic motor 187 to which it is connected. This adjustment is necessary to assure proper operation of the heater panel rotating mechanism when the distance between the heater panels and web 102 is altered.

At its upper end, member 186c of connecting rod 186 is surrounded by the tubular portions 186g of a motion transmitting bracket 186b which is fixed to rod 186c by a lock nut 186h. Bracket 186b also includes an arm 186i fixed by a pin 190 to a U-shaped bracket or clevis 192. As shown in FIGURE 11, clevis 192 is fixed to the upper end of a piston rod 194 attached, at its lower end, to a reciprocating piston 196 in the cylinder 197 of pneumatic motor 187. Pneumatic motor cylinder 197 is bolted or otherwise fixed to a structural member of the coating apparatus identified generally in FIGURE 11 by reference character 198.

Referring now to FIGURES 11, 11A and 23, cylinder 197 of pneumatic motor 187 is connected by four-way solenoid valve 200 (the solenoid operators of valves 200 are identified by reference characters SA-SN in FIGURE 23) and conduits 201 to any suitable source of compressed air or other fluid. When the solenoid operator of a particular valve 200 is deenergized, the lower end of the cylinder 197 of the associated pneumatic motor is connected through conduit 201 to the compressed air source. This admits compressed air to the lower end of the cylinder, moving piston 196 toward the upper end of the cylinder. As piston 196 moves upwardly, it, through piston rod 194 and connecting rod 186, rotates crank 184 in a counterclockwise direction through a 90° angle. This rotates the shaft 174 to which crank 184 is fixed through the same 90° counterclockwise angle. Through the sprocket and chain drive discussed above, the other four shafts 174 are rotated in unison with the crank mounting shaft 174 through the same 90° counterclockwise angle. This movement of shafts 174 pivots heater panels 130 through a 90° counterclockwise angle, moving them from their normal positions to the positions shown in dotted lines in FIGURE 11. In the latter positions, heater panels 130 direct the radiant energy emitted from their quartz lamp infrared generators 150 away from the web 102. As discussed above, this is an important feature of the present invention since, in the event of web stoppage or other emergency, the panels are swung in the manner just described to positions in which they are ineffective to overheat the web, avoiding the possibility of fire and/or damage to the web.

As mentioned above, the frames 132 in which heater panels 130 are mounted are arranged so that the distance between the heater panels and web 102 can be adjusted. The mechanism by which frames 132 are supported and adjusted is illustrated in FIGURES 15-18. As each of the frames 132 is supported in an identical manner, only the mounting and adjusting means of a single frame will be described, with the understanding that the description is equally applicable to the remaining frames.

Slides 202, fixed to the four corners of frame 132, cooperate with vertically extending, hollow, rectangularly sectioned guides 204, fixed in any suitable manner to the structural framework of the coating apparatus, to position frame 132 with the open faces 158c of heater panels 130 parallel to web 102. As best shown in FIGURES 15 and 16, each of the guides 204 has a vertically extending slot 204a into which bolts 212 extend. Bolts 212 are threaded through a vertically extending flange 202a of slides 202 which are bolted or otherwise fixed to frame 132.

As shown in FIGURE 15, the heads 212a of bolts 212 bear against the edges of flanges 204b located on opposite sides of the slot 204a in guide 204. Nuts 212b, threaded on the ends of the bolts, engage the flange 202a of each slide 202 and hold it against the associated guide 204. The above described arrangement cooperates with identical arrangements at the other three corners of each frame 132 to position the frame in a horizontal plane, while permitting it to move freely in a vertical direction.

The vertical disposition of each frame 132 is controlled by employing, at each of the four corners of the frame, the adjustable supporting mechanism 205 shown in FIGURES 17 and 18. Referring now to these figures, adjusting mechanism 205 includes a nut 206 welded to the bottom of the horizontal portion of the structural member from which frame 132 is fabricated. A vertically extending adjusting screw 207 is threaded into nut 206 at its lower end. The head 207a at the upper end of screw 207 rests on a collar 210 of any suitable material from which it is separated by a preferably brass washer 208. Collar 210 is welded to an angle member 211 which, in turn, is fixed as by welding to the structural framework of the coating apparatus. Heater frame 132 can be raised and lowered by turning the heads 207a of the four adjusting screws 207, causing nuts 206 to move upwardly (or downwardly) along the screws, thereby raising or lowering the frame attached to the nuts.

As discussed above, web 102 passes from infrared predrying oven 110, just described, through a convection drying oven 112 where approximately 80% of the water added to web 102 at coating station 108 is evaporated from the web. As shown in FIGURE 1, convection drying oven 112 has two sections identified generally in FIGURE 1 by reference characters 113 and 115. In general, each of these convection oven sections consists of an elongated tunnel of any desired design through which heated air is blown to evaporate the liquid carrier component of the coating material from web 102. The air supply and vapor exhaust system of convection drying oven section 113 has a fresh air inlet 113a through which air enters from the ambient atmosphere, passing through an inlet duct 113b to a steam heated heat exchanger 113c, where its temperature is raised to a maximum of not over 200° F. From steam heater 113c, the heated air is forced by blowers 113d and 113e through warm air ducts 113f and 113g into section 113 of the drying oven.

A similar warm air supply system consisting of fresh air inlet 115a, air duct 115b, steam heater 115c, supply blowers 115d and 115e, and warm air ducts 115f and 115g are provided for section 115 of the oven.

If the coating material employed in a particular application of the present invention is non-flammable, the drying air and non-flammable liquid carrier are exhausted from drying oven sections 113 and 115 by an exhaust fan 112a through a stack 112b. If the coating apparatus of the present invention is used with materials containing flammable solvents, the flammable liquid carrier is diluted with air and exhausted from oven sections 113 and 115 by exhaust fan 112a and by a second exhaust fan 112c through a stack 112d.

As just discussed, convection drying oven 112 has two drying sections, 113 and 115, the first of which is employed with infrared ovens 110 and 114 to dry and fuse the first coat of coating material to web 102. The second section 115 is used in association with infrared ovens 120 and 122 to evaporate the liquid carrier from the second coat of coating material applied to web 102.

Convection drying ovens, as just described, are well known and are commercially available from several sources. For this reason and because the details of the convection drying oven form no part of the present invention, it is not believed necessary to describe them herein.

As indicated previously, web 102 passes from the first section 113 of convection drying oven 112 through an infrared fusing oven 114 where the dried coating is fused and bonded to web 102. Fusing oven 114 may be identical to the infrared predrying oven 110 except that, as discussed above, it has a different number of quartz lamp heating elements 150.

The second set of infrared ovens, infrared predrying oven 120 and infrared fusing oven 122, may also be identical to the infrared predrying oven 110 just described.

The electrical circuitry for the novel coating apparatus just described is shown in FIGURES 19–24. The input to this circuitry is three power mains L1, L2, and L3, which are connected through circuit breakers 300a, 300b, and 300c to a source of three-phase, 60 cycle, alternating circuit power.

INFRARED GENERATOR POWER CIRCUITS

Referring now to FIGURES 19 and 20, infrared generators 150 are connected to mains L1, L2, and L3 by conductors Lx, Ly, and Lz. The circuit shown in FIGURE 20 is that for the infrared generators 150 in infrared predrying oven 110. The power supply circuits of the infrared generators in the first infrared fusing oven 114 and the infrared generators in the second infrared predrying oven 120 and the second infrared fusing oven 122 are similar to those illustrated in FIGURE 20. Therefore, only the circuits of oven 110 will be described in detail, it being understood that this detailed description is equally applicable to the circuits of the other three infrared ovens, 114, 120, and 122.

As mentioned above, there are 18 heater panels 130 in infrared predrying oven 110. These panels are identified in FIGURE 20 by reference characters P1–P18. Each panel 130 has four quartz lamp infrared generators 150 so that there are a total of 72 infrared generators in oven 110. Normally, however the circuits to 20 of the quartz lamps are disconnected. These lamps can be connected into the circuit of FIGURE 20: (a) to provide additional heat; (b) to alter the pattern of heat distribution; or (c) to replace burned out tubes.

The 20 normally inactive quartz lamps 150 can be installed and left with one terminal disconnected as shown in FIGURE 20 or can be omitted and installed as needed. Preferably, however, they are installed with one terminal connected to the appropriate conductor and the other to a terminal board incorporated in panel box 450 (see FIGURE 25). This permits the inactive lamps 150 to be connected into the circuit of FIGURE 20 as desired without shutting down the coating apparatus.

The 52 active tubes are divided into four separately regulatable heat zones. Zone 1 includes panels P1, P2, P4, and P5; zone 2, panels P3, P6, P8 and P10; zone 3, panels P7, P9, P11, P13, and P16; zone 4, panels P12, P14, P15, P17, and P18. Panels P16 and P18 each have two inactive lamps 150 and each of the other panels has one inactive lamp.

In FIGURE 20, the branch leads 20 connecting the resistance heating elements 154 of quartz lamps 150 to the conductors Lx, Ly, and Lz of the three-phase circuit are identified as follows: the first character (1, 2, 3, or 4) identifies the heat zone in which a particular lamp is located; the second character ($x$, $y$, or $z$) identifies the main line (Lx, Ly, or Lz) to which a lead to the lamp is connected; and the third character ($a$ or $b$) identifies a lead as to one of a pair of quartz lamps 150 normally connected in series for full heat, an "$a$" lamp always being connected in series with a "$b$" lamp. There are a pair of leads across each of the three phases in each of the four heat zones, making a total of 24 leads to oven 110. Each of these leads is provided with a fuse or other circuit breaker CB and is connected to a main lead Lx, Ly, or Lz through a normally open relay contact (1C1A–1C8A, 1C1B–1C8B, or 1C1C–1C8C).

As shown in FIGURE 20, quartz lamp resistance elements 154 (which are wound for use with either 110 or 220 volt power) can be connected with two elements in series across each of the 440 volt phases between conductors Lx and Ly, Lx and Lz, or Ly and Lz by closing the normally open contacts 1C1A to 1C8C in the branch leads 1Xa to 4Zb connecting resistance elements 154 to the main leads. For example, if contacts 1C1A and 1C2A are closed, the heater elements of lamps 1 and 2 will be connected in series across lines Lx and Ly; and each resistance element will have a voltage of 220 volts across it, so that both lamps 1 and 2 will have a maximum heat output.

However, by leaving the contacts in appropriate branch leads open, only alternate branch leads will be energized; and four quartz lamp resistance elements 154 will be serially connected in each branch circuit across a 440 volt phase. For example, if contacts 1C1A and 1C1B are closed, and contact 1C2A left open, coils 1, 2, 14, and 13 will be connected in series across main leads Lx and Lz. Each coil will then have a voltage across its terminals of 110 volts, cutting the current flow by one half and reducing the wattage or heat output to one fourth of that obtained when there is 220 volts across the lamps. This arrangement is used to provide a low heat output when such is desired.

Figure 22B:
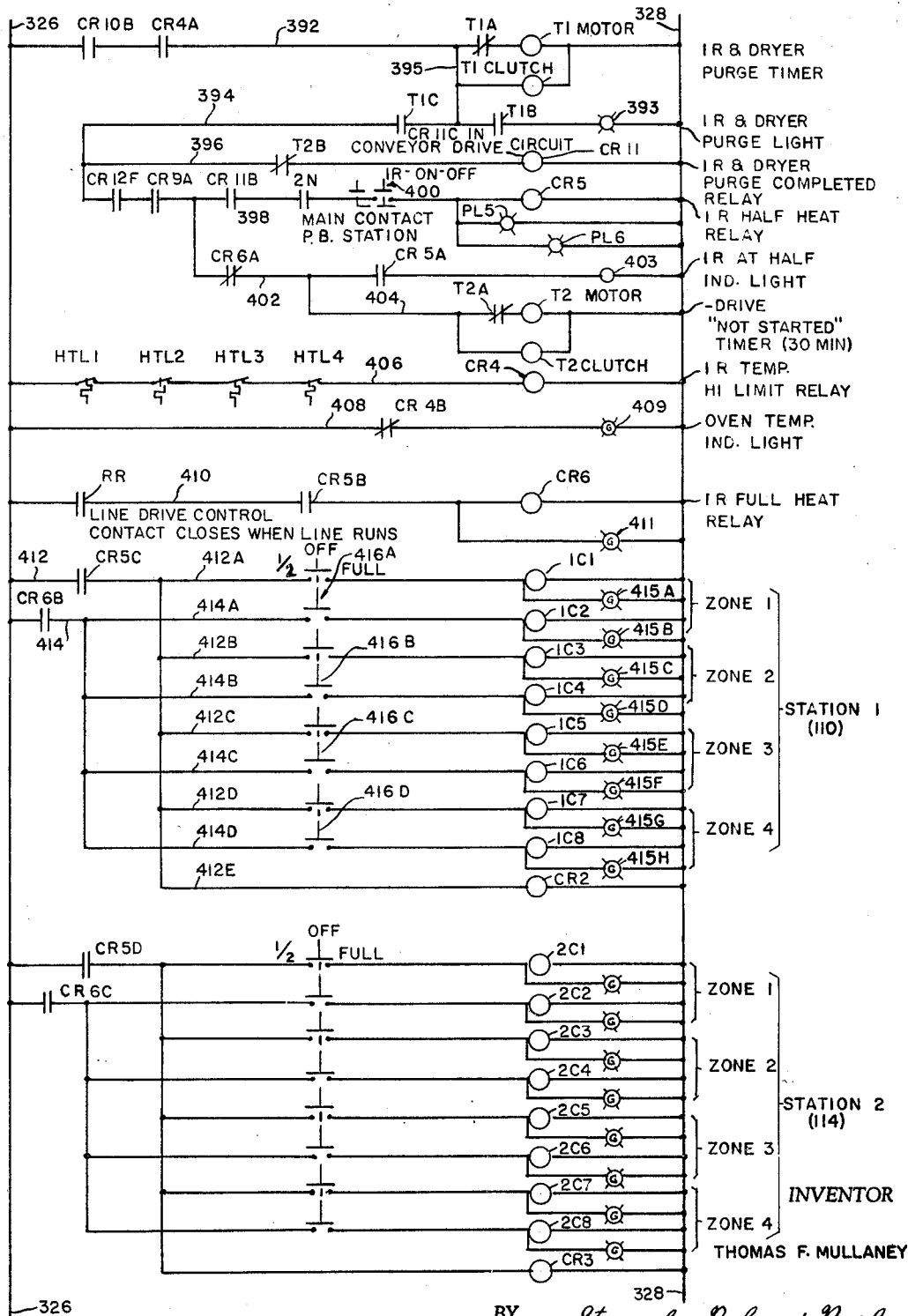
Figure 22C:
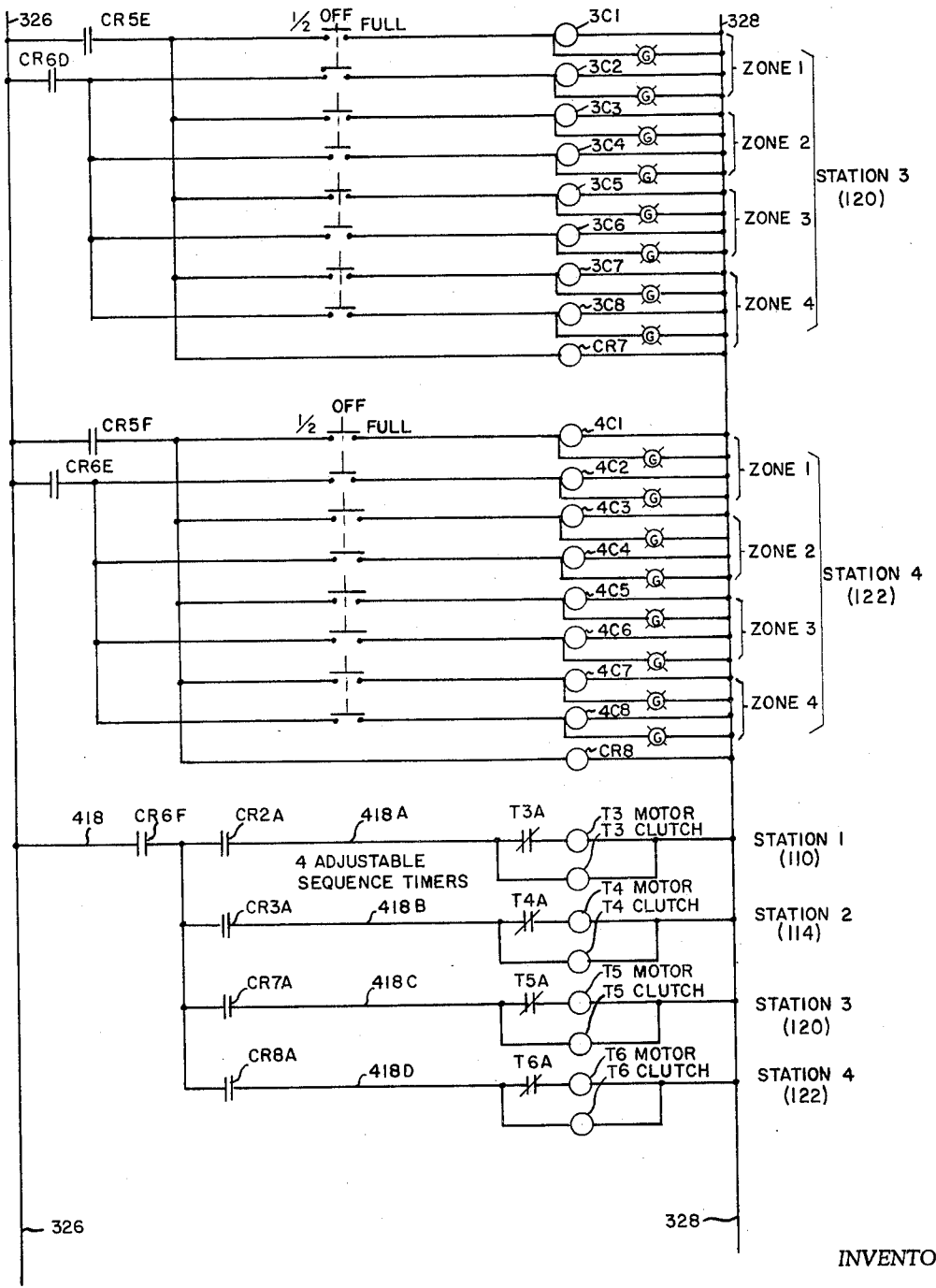

Referring now to FIGURES 22B and 22C, the quartz lamp infrared generators 150 in the first infrared fusing oven 114 and the second infrared predrying and fusing ovens 120 and 122 are wired and connected to the power source in the same manner as the lamps in oven 110. Specifically, the application of operating voltage to the lamps in oven 114 is controlled by the contacts of relays 2C1–8, those in oven 120 by the contacts of relays 3C1–8, and those in oven 122 by the contacts of relays 4C1–8. Since the circuits in which the relay contacts are interposed are similar to those shown in FIGURE 20, they have been omitted to avoid needless repetition.

There are 14 heater panels 130 in ovens 114 and 120 and 16 heater panels in oven 122. The panels in each of these ovens are grouped into four individually regulatable heating zones as in oven 110. All four zones in oven 122 have four heater panels 130. These panels are wired in the same manner as the panels in zones 1 and 2 of oven 110. Ovens 114 and 120 each have two "four panel" zones wired in the same manner as zones 1 and 2 of oven 110 and two "three panel" zones wired in the manner shown in FIGURE 20. The "three panel" zones need not be adjacent as shown in FIGURE 20, but are preferably separated by zones with different numbers of panels as in oven 110.

QUARTZ LAMP CHECKING CIRCUIT

To detect burned out infrared generators 150 in oven 110, the circuit illustrated in FIGURE 21 is used. Eight of the branch leads to lamps 150. 1Xa, 1Ya, 2Xa, 2Ya, 3Xa, 3Ya, 4Xa and 4Ya are encircled by inductance coils 302, 303, 304, 305, 306, 307, 308, and 309, respectively. One end of each of these coils is connected by a conductor to one of eight contact buttons 312, 313, 314, 315, 316, 317, 318 and 319 located on panel board 450. The opposite end of each of these coils in connected through an ammeter 320 to a movable contact arm 322 which can be rotated into engagement with any one of the eight contact buttons to complete a circuit through the ammeter and the coil connected to the button contacted by arm 322.

The alternating current passing through the branch lead encircled by the coil connected to ammeter 320 will induce a current in the circuit including the coil and ammeter which is proportional in magnitude to the current in the branch lead. If the heating element of one of the infrared generators 150 in the circuit being tested is burned out, there will be a noticeable drop in the reading of the ammeter. In a few seconds, all eight circuits can be checked by moving the contact arm successively to each button.

Since there are normally only two lamps in each branch circuit, this greatly facilitates the identification of burned out tubes. It is customary to make this check once each day, since the tubes are not exposed where they can be visually inspected.

A similar lamp checking circuit is provided for each of the other infrared ovens 114, 120, and 122.

FAN MOTOR POWER CIRCUITS

Figure 7:
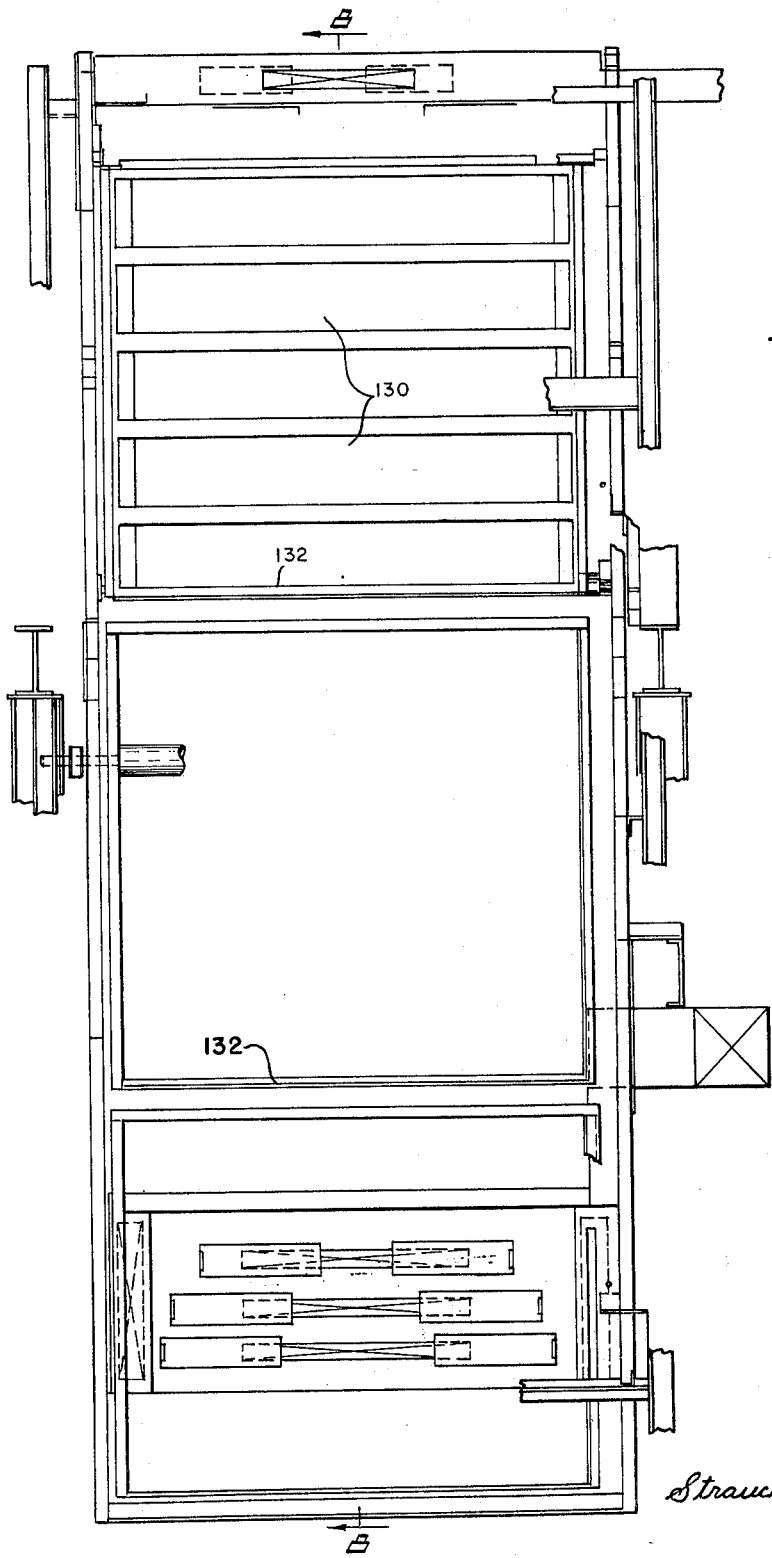
FIGURE 7 is an end view of the second predrying oven looking in the direction of arrows 7—7 of FIGURE 6.
Figure 8:
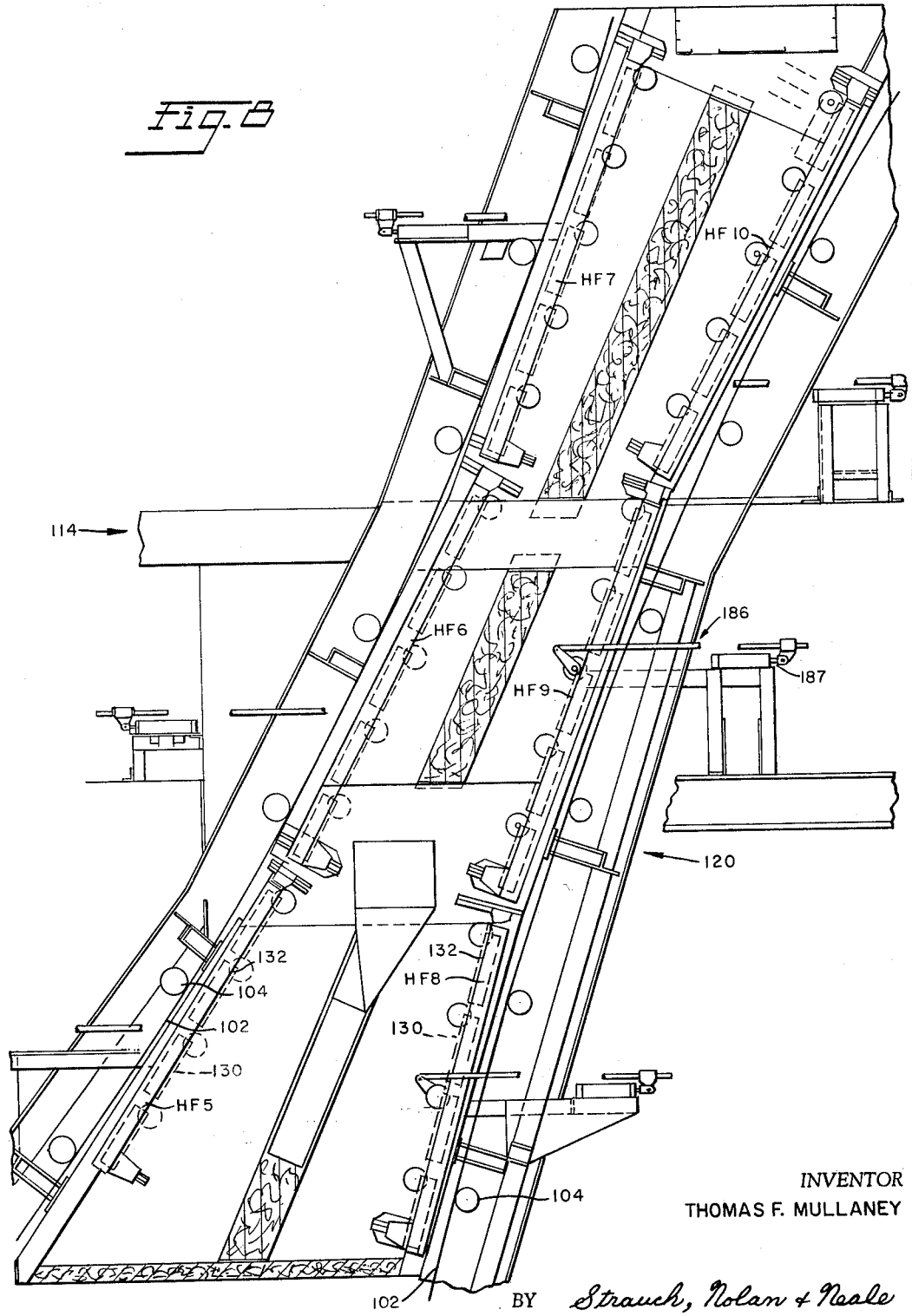
FIGURE 8 is a longitudinal section through the ovens of FIGURE 6 taken substantially on line 8—8 of FIGURE 7.
Figure 9:
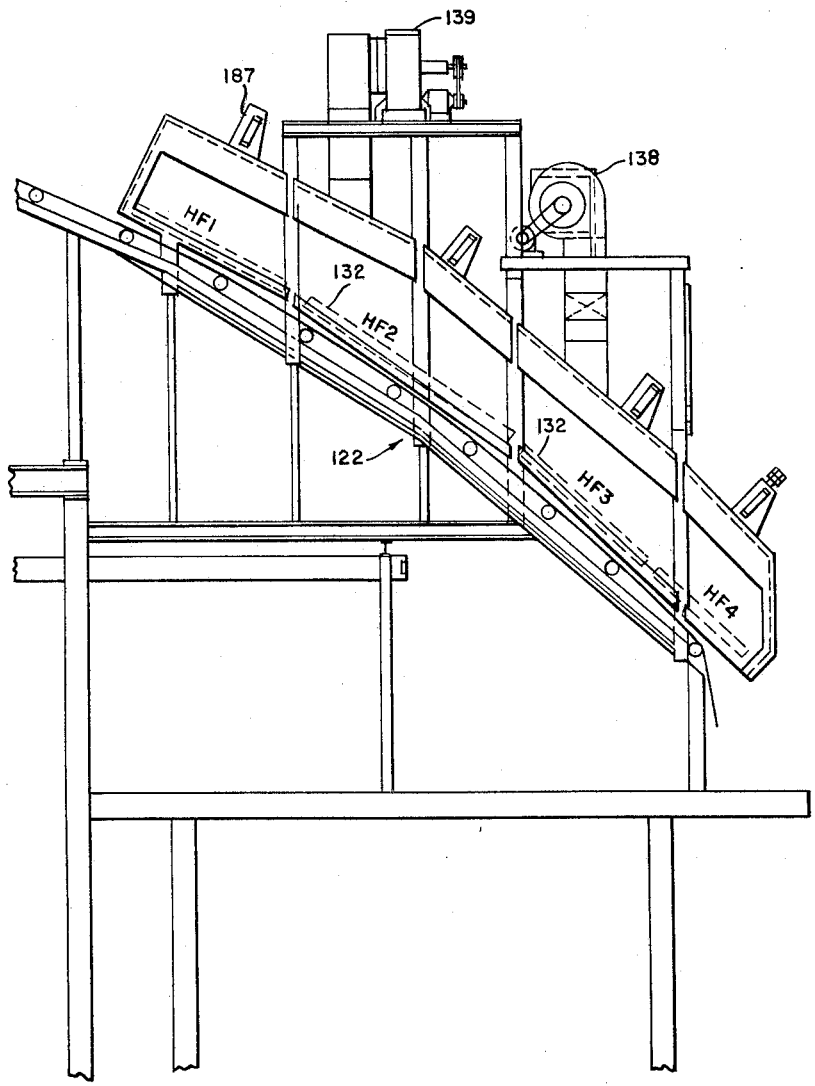
FIGURE 9 is a side view of a second infrared fusing oven employed in the coating apparatus of FIGURE 1.

As described above, the four infrared predrying and fusing ovens 110, 114, 120, and 122 are all provided with forced air ventilating systems and the two section convection drying oven 112 is provided with a forced air system for circulating heated drying air. Turning now to FIGURE 19, motor M1 drives exhaust fan 137 (see FIGURE 6) of the first infrared fusing oven 114 and the second infrared predrying oven 120; motor M2 drives exhaust fan 135 (see FIGURE 2) of infrared predrying oven 110; motor M3 drives supply fan 136 (see FIGURE 6) of oven 114; motor M4 drives exhaust fan 139 (see FIGURE 9) of infrared fusing oven 122; motor M5 drives supply fan 134 (see FIGURE 2) of oven 110; and motor M6 drives supply fan 138 (see FIGURE 9) of oven 122. Motor EX1 drives the exhaust fan 112c for exhausting flammable vapors from convection predrying oven 112; and motor EX2 drives exhaust fan 112a for exhausting non-flammable solvents or carriers from the drying oven. Motor SF1 drives supply fan 113d for zone 1 of the first section 112 of the convection drying oven, and motor SF2 drives supply fan 113e for zone 2 of the drying oven's first section; motor SF3 drives supply fan 115d for zone 3 of the drying oven's second section 115, and motor SF4 drives supply fan 115e for zone 4 of section 115 of the drying ovens.

Each of motors M1, M2, M3, M4, M5 and M6, is of the three-phase type and is connected to the three-phase power means L1, L2 and L3 through a fused magnetic starter (M1S to M6S, respectively). Two of the branch leads to each motor are also connected to the power mains through overload cutouts MC. Manual disconnects MD provided adjacent each motor M1–M6 are opened for servicing the motor.

Each of the three-phase motors EX1, EX2, SF1, SF2, SF3 and SF4 (which drive the exhaust and supply fans of convection drying oven 112) is connected to the three-phase power mains L1, L2, and L3 through a magnetic motor starter provided with a fused disconnect (EX1S, EX2S, SF1S, SF2S, SF3S and SF4S). Two of three-phase branch leads to each motor are also connected to the mains through overload cutouts MC.

INFRARED GENERATOR AND FAN MOTOR CONTROL CIRCUITS

Referring now to FIGURE 19, the controls of the coating apparatus are operated by 115 volt, single phase, 60 cycle power provided by a transformer 324. The primary of the transformer is connected across two of the power mains L2 and L3, and the transformer's secondary is connected to the control circuit's main leads 326 and 328 which are fused with fuses 300 and 132.

Referring next to FIGURE 22A, a number of branch circuits for operating the fan motors described above under the heading FAN MOTOR CIRCUITS are connected between main control leads 326 and 328. As shown in FIGURE 22A, each of these circuits includes a conductor (350 to 361) connected between main control leads 326 and 328 and one of the twelve magnetic starters (M1S–M6S, EX1S, EX2S, and SF1S–SF4S) just described. A green signal lamp 362 is connected in parallel with each of the magnetic starters and is lit when the starter is energized.

Each of the branch circuits is provided with a manual on-off switch 364 (shown as two separate switches 364a and 364b in FIGURE 22A for the sake of clarity) which, when open, interrupts circuitry continuity at both ends of the associated circuit.

Each of the branch circuits is also provided with a normally open start button (366a–366l) which, assuming that the manual on-off switch 364 is closed, completes the circuit through the associated motor starter when it is depressed. Arranged in series with each start button is a stop button (368a–368l) which interrupts the continuity of the associated branch circuit and stops the motor controlled by the circuit when it is depressed. Both start buttons 366a–l and stop switches 368a–l may be of the conventional spring loaded type so that, when released, they will return to the position shown in FIGURE 22A.

The five branch circuits defined by conductors 350–354 also include normally open relay contacts CR1A–CR1E, respectively, which are connected in series with the manual on-off switches, start and stop switches, and magnetic starter. These contacts are closed by the energization of a relay coil CR1 connected in a branch circuit 372 extending between control circuit main leads 326 and 328. Normally open relay contacts CR12G and CR12A–CR12F are similarly arranged in the branch circuits 355–361. The last-mentioned relay contacts are closed by the energization of a relay coil CR12 connected in parallel to relay CR1 and to lead 372.

Referring still to FIGURE 22A, each of the branch circuits 350–361 has a holding circuit around the associated start button (366a–l) and the contact of relay CR1 or CR12 in the circuit. Each holding circuit includes a lead connected in parallel to the associated lead 350–361 in which a normally open contact M1A–M6A, EX1A, EX2A, or SF1A–SF4A is interposed. These contacts are incorporated in and are closed when the associated magnetic starter is energized. For example, when magnetic starter M1S in branch circuit 350 is energized, contact M1A is closed, completing a holding circuit around relay contact CR1A and start switch 366a.

The final components in each of the branch circuits 350–361 are a pair of serially arranged overload contacts 370 and 371 which open and interrupt the associated circuit, deenergizing the motor controlled thereby, if the motor is overloaded.

Referring now to FIGURES 19 and 22A, to start the exhaust and supply fan motors, the manual disconnect switches MD in the fan circuits must be closed as must the manual on-off switches 364a–364b in the motor control circuits. With these switches and relay contacts CR1A–E and CR12A–G closed, the respective start switches 366a–l are successively depressed. Depression of start switch 366a, for example, completes a circuit from main control circuit lead 326 through lead 350 to the main control lead 328, energizing magnetic motor starter M1S. Upon being energized, the magnetic motor starter closes its three contacts M1Sa, M1Sb, and M1Sc in the three leads connecting exhaust fan motor M1 to the three mains L1, L2, and L3, respectively, causing motor M1 to operate. Energization of magnetic starter M1S also closes its contact M1A in the holding circuit around relay contact CR1A and start switch 366a. Start switch 366a may then be released.

To stop a particular supply or exhaust fan motor, the appropriate stop switch, for example switch 368a, is depressed, opening its contact and interrupting the continuity in branch circuit 350. This deenergizes magnetic starter M1S, causing it to open its contacts M1Sa, M1Sb and M1Sc in the leads connecting motor M1 to power mains L1, L2, and L3, deenergizing the motor. Also, magnetic starter contact M1A opens, interrupting the holding circuit around relay contact CR1A and start switch 366a, restoring them to the condition shown in FIGURE 22A. The relay contacts CR1A–E and CR12A–G which, as just described, must be closed to energize the supply and exhaust fan motors, are provided to adapt the coating apparatus for use both with coating materials having flammable and those having non-flammable liquid carriers. These contacts insure that, if the particular coating material being used does have a flammable carrier, the quartz lamp infrared generators 150 cannot be energized during the production run or thereafter until the infrared predrying and fusing ovens have been purged of flammable vapors.

Referring still to FIGURE 22A, the circuitry by which the infrared generators 150 are locked out for production runs where flammable vapors are present and for purging includes four parallel leads 372, 374, 376, and 378 connected in parallel between control circuit main leads 326 and 328. The foregoing leads are energized and deenergized in pairs by a selector switch 380 with two blades 380a and 380b arranged to selectively close either contacts 382 and 385 in leads 372 and 378 or contacts 383 and 384 in leads 374 and 376. In the position shown in FIGURE 22A, in which contacts 382 and 385 are closed, infrared generators 150 are locked out and the coating apparatus is conditioned for operation with a flammable coating material or for purging the infrared predrying and fusing ovens of flammable vapors prior to operation with a non-flammable coating.

If a coating material having a non-flammable liquid carrier is to be employed, however, switch 380 is moved to the alternate position, opening the contacts 382 and 385 in leads 372 and 378 and closing the contacts 383 and 384 in leads 374 and 376.

In addition to controlling the operation of infrared generators 150, leads 372 and 374 provide circuits for controlling the flow of air through convection oven 112. As discussed above, if a coating material utilizing a non-flammable liquid carrier is employed, circulation of a relatively low volume of air through oven 112 is required since only sufficient air to remove from the oven the liquid evaporated from web 102 is needed. On the contrary, when the coating material being employed has a flammable liquid carrier, a much larger volume of air is employed to dilute the evolved flammable carrier to such an extent that it will not pose a fire hazard.

To control the air flow through convection drying oven 112, dampers (not shown), which are biased to a fully open position, are disposed in exhaust stacks 112b and 112d. These dampers may be partially closed to reduce the volume of air exhausted from oven 112 by energizing two three-way solenoid valves 373 and 375 (see FIGURE 22A). With switch 380 in the position shown and the coating apparatus conditioned for use with a coating material having a flammable carrier or for purging the various infrared predrying and fusing ovens, the continuity of lead 374 is interrupted, solenoid valves 373 and 375 are deenergized and the dampers in stacks 112b and 112d are fully open. Throughout the coating operation with a flammable carrier, switch 380 is maintained in the illustrated position.

When a switch is made to the use of the coating material having a non-flammable carrier, switch 380 is maintained in the illustrated position only until the coating apparatus is purged; and then it is moved to its alternate position to open contacts 382 and 385 and close contacts 383 and 384. This energizes three-way valves 373 and 375, moving the dampers in exhaust stack 112b and 112d to the partially closed position to reduce the flow of air through the convection drying oven.

As indicated above, the details of convection drying oven 112 form no part of the present invention. Therefore, it is not believed necessary that the details of the dampers in stacks 112b and 112d or the details of the linkages between these dampers and valves 373 and 375 need be explained herein, especially as such ovens equipped with valve controlled dampers as just described are commercially available items.

The branch circuits 376 and 378 controlled by switch 380 are employed to provide an indication of the position of switch 380 at the conveyor apparatus. The signal lamps PL1 and PL2 connected in parallel in lead 376 are located, respectively, at the first section of the coating apparatus comprising infrared predrying oven 110, the first section 113 of convection drying oven 112, and infrared fusing oven 114; and at the second section of the coating apparatus comprising infrared predrying oven 120, the second section 115 of convection drying oven 112, and infrared fusing oven 122. With switch 380 in the alternate position just described, contact 384 is closed; and signal lamps PL1 and PL2 are lit.

A second pair of signal lamps PL3 and PL4 are connected in parallel in lead 378 and likewise located at the first and second sections of the coating apparatus. These signal lamps are lit when switch 380 is in the position illustrated in FIGURE 22A in which contact 385 is closed, establishing continuity in branch circuit 378 between main control circuit leads 326 and 328.

Also connected in parallel between control circuit main leads 326 and 328 are branch circuits 388 and 390. Wired in series in branch circuit 388 are relay CR9, relay contact M6B, air switch AS6, relay contact M5B, air switch AS5, relay contact M4B, air switch AS4, relay contact M3B, and air switch AS3. Normally open contacts M3B, M4B, M5B, and M6B are incorporated in magnetic starters M3S, M4S, M5S, and M6S, respectively. These magnetic starters control, respectively, the motors of: (a) the supply fan 136 which supplies air to the first infrared fusing oven 114 and the second infrared predrying oven 120; (b) the motor M4 of the exhaust fan 139 of the second infrared fusing oven 122; (c) the motor M5 of the supply fan 134 of the first infrared predrying oven 110; and (d) the motor M6 of the supply fan 138 of the second infrared fusing oven 122.

When the foregoing magnetic starters are energized, to effect operation of motors M3–M6, normally open contacts M3B–M6B are closed.

Air switches AS3–AS6 may be any of a number of commercially available flow responsive switches and are located, respectively, in the duct connecting fan 136 to ovens 114 and 120, the exhaust duct connecting oven 122 to exhaust fan 139, the supply duct connecting fan 134 to oven 110, and the supply duct connecting oven 122 to supply fan 138. The air flow switches operate in a conventional manner, having normally open contacts and a vane or other member operated by the flowing air to close the normally open contacts.

When motors M3–M6 are energized in the manner described above, fans 136, 139, 134, and 138 effect flow through the ducts to which they are connected, closing air switches AS3–AS6 and establishing continuity in branch circuit 388 (it will be remembered from above that the contacts M3B–M6B in this circuit are closed when the magnetic starters associated with motors M3–M6 are energized) and energizing relay CR9. As will be explained presently, energization of relay CR9 is necessary for operation of the infrared lamps 150 in ovens 110, 114, 120, and 122.

To activate quartz lamp infrared generators 150, a second relay CR10 must be energized in addition to relay CR9. Relay CR10, which must also be energized to permit the mechanism conveying web 102 through the coating apparatus to operate, is incorporated in the branch circuit 390 referred to above. In addition to relay CR10, branch circuit 390 includes, in a series arrangement, contact M2B, air switch AS2, contact M1B, air switch AS1, and contacts CR1G, EX1B, EX2B, and SF1B–SF4B.

Contacts SF1B, SF2B, SF3B, and SF4B are incorporated in the four magnetic starters SF1S–SF4S which control the motors SF1–SF4 of the four blowers 113d, 113e, 115d, and 115e supplying drying air to the two sections 113 and 115 of drying oven 112 and are closed when these motors are started. Contact EX2B is incorporated in and is closed when the magnetic starter EX2S which controls motor EX2 is energized. Motor EX2 drives the exhaust fan 112a of convection drying oven 112 which, it will be remembered, is the only fan operated when the coating material has a non-flammable liquid carrier.

Contact M1B closes when the magnetic starter M1S for motor M1 is energized. Motor M1, it will be remembered, operates the exhaust fan 137 for the first infrared fusing oven 114 and the second infrared predrying oven 120.

Contact M2B is closed when the magnetic starter M2S controlling the motor M2 for the exhaust fan 135 of the first infrared predrying oven 110 is energized.

Air switch AS1 is located in the duct connecting exhaust fan 137 to infrared fusing oven 114 and infrared predrying oven 120; and air switch AS2 is located in the duct connecting exhaust fan 135 to infrared predrying oven 110. Air switches AS1 and AS2 are closed when fans 137 and 135 are operating and air is flowing through the ducts.

With the various magnetic starter contacts and flow switches closed, operating voltage will be applied to relay CR10 if relay contact CR1G has theretofore closed by energization of relay CR1. The branch circuit 372 in which relays CR1 and CR12 are incorporated is completed to energize relays CR1 and CR12 when the coating material being employed has a flammable liquid carrier and to purge the coating apparatus of flammable vapors after the use of such a coating material as discussed previously. This branch circuit is completed by depressing normally open push button switch 386, energizing relays CR1 and CR12 which close their contacts in branch circuits 350–361. The foregoing branch circuits may be completed by the depression of start switches 366a–366e as explained above. Energization of relay CR1 also causes it to close a contact CR1F connected in parallel with branch circuit 372 which prevents relays CR1 and CR12 from being deenergized when push button switch 386 is released. Energization of relay CR1 also closed contact CR1G in branch circuit 390.

When all of the foregoing contacts are closed, by operation of the coating apparatus components just described, branch circuit 390 is completed between control circuit main leads 326 and 328, energizing relay CR10.

Connected in parallel with branch circuit 390 and around contacts EX1B and CR1G is a branch circuit 391 in which are arranged, in series, contacts CR1A, CR11A, and CR1H. Contact CR1H is normally closed; i.e., it is closed when relay CR1 is deenergized. Contacts CR10A and CR11A are normally open.

When selector switch 380 is in the position illustrated in FIGURE 22A completing branch circuit 372 and energizing relay CR1, contact CR1G is closed and contact CR1H is open. Contact CR10A is closed by deenergization of relay CR10 as described above. Contact CR11A is closed at the end of the purge cycle and insures that the exhaust fans cannot be turned off without stopping the coating apparatus until the purge cycle has been completed.

If the coating material being employed has a flammable liquid carrier so that selector switch 380 is maintained in the illustrated position, branch circuit 390 remains energized by the closing of the various contacts in this circuit in the manner just described. However, if the coating material being employed has a non-flammable liquid carrier, selector switch 380 is moved to its alternate position after the coating apparatus is purged of flammable vapors, opening contacts 382 and 385 and closing contacts 383 and 384, and thereby deenergizing relay CR1. This has no effect on relay contacts CR10A and CR11A in branch circuit 391, which remain closed. However, deenergization of relay CR1 opens contact CR1G in branch circuit 390 and closes contact CR1H in branch circuit 391. These two contacts are arranged so that one or the other is always closed by overlapping their opening and closing movement. Hence, relay CR10 will remain energized when selector switch 380 is moved to the alternate position. As contact EX1B is no longer in the relay energizing circuit when contact CR1H is closed, exhaust fan EX1, which drives exhaust fan 112c which is employed only when the coating material has a flammable liquid carrier can be turned off by depressing stop button 368g. This, which deenergizes magnetic starter ES1S, opening contact EX1B, will not affect relay CR10.

The duration of the cycle purge is controlled by a first timer T1 (see FIGURE 22B) having a motor wired in series with relay contacts CR10B and CR4A and a normally closed timer contact T1A in a branch circuit 392 connected between control circuit main leads 326 and 328. Relay contact CR10B is closed by deenergization of relay CR10. Relay contact CR4A is controlled by relay CR4 which is normally energized, but is deenergized if the temperature in any of the four infrared ovens 110, 114, 120, or 122 exceeds a predetermined maximum. Consequently, when relay CR10 is energized in normal operation, the circuit through the motor of timer T1 is completed, causing the timer to run through its timing cycle. That the purge cycle is taking place is indicated by the lighting of a red signal lamp 393 connected in series with normally closed timer contact T1B between branch circuit 392 and control circuit main lead 328.

At the end of the purge cycle, timer contacts T1A and T1B open and normally open timer contact T1C closes.

Opening of timer contact T1A stops the motor of timer T1; and opening of timer contact T1B extinguishes lamp 393, indicating to the operator that the purge cycle has been completed and that exhaust fan 112C can be turned off.

Timer contact T1C is connected to branch lead 392 by lead 395 and, by lead 394, to a lead 396 connected to control circuit main lead 328. Arranged in series in lead 396 is the normally closed contact T2B of a timer T2 and relay CR11. Therefore, when timer contact T1C closes, a circuit is completed from main lead 326 through leads 392, 395, 394, and 396 to main lead 328, energizing relay CR11 and closing its contact CR11A in branch lead 390 (see FIGURE 22A). As explained above, relay contact CR11A is in the branch circuit around contacts EX1B and CR1G in branch circuit 390 which permits exhaust fan 112C to be turned off at the end of the purging cycle without interrupting the circuit to relay CR10 and prevents the exhaust fans from being turned off before the purge cycle is completed without stopping the coating apparatus which insures that the ovens are purged before infrared generators 150 are turned on.

Energization of relay CR11 also closes its normally open contact CR11B (which is interposed in a lead 398 wired in parallel with lead 396) and closes its normally open contact CR11C (see FIGURE 24). Closing of the latter contact conditions the conveyor drive which is shown in FIGURE 24 and which will be described presently under the heading CONVEYOR DRIVE, permitting the mechanism by which web 102 is moved through the coating apparatus to be started. Thus relay CR11, through its contact CR11C, insures that the conveyor is not started to move web 102 through the coating apparatus until the purge cycle has been completed.

Connected in series with relay contact CR11B in the branch circuit 398 just described are normally closed relay contacts CR12F, normally closed relay contact CR9A, a conveyor drive activated contact 2N which is closed when operating voltage is applied to the conveyor drive motor, infrared generator on-off switch 400, and low heat relay CR5.

With selector switch 380 in the position illustrated in FIGURE 22A, relay CR12 is energized, as described above, and its normally closed contact CR12F in branch circuit 398 is open, preventing this circuit from being completed. As will become apparent presently, the quartz lamp infrared generators 150 cannot be energized until continuity is established in branch circuit 398. When selector switch 380 is moved to its alternate position in which contacts 382 and 385 are open and contacts 383 and 384 closed, relay CR12 is deenergized, closing normally closed contact CR12F; and, providing the other contacts in branch circuit 398 are closed, the quartz lamp infrared generators 150 can be energized. Since branch circuit 398 is connected to control circuit main lead 326 through the normally open contact T1C of timer T1, which closes at the end of the timing cycle, it will be apparent that continuity cannot be established in branch circuit 398 until the purging cycle has been completed. This, therefore, prevents the quartz lamp infrared generators 150 from being energized during the purging cycle when flammable vapors may still be present in the infrared ovens.

The relay contact CR9A in branch circuit 398 is closed by the energization of the relay CR9 in branch circuit 388 in the manner previously explained. This contact is provided in circuit 398 to insure that the blower 136 supplying air to infrared ovens 114 and 120, the fan 139 exhausting air from infrared oven 122, and the fan 134 supplying air to infrared oven 110 are operating and moving air through the ducts connecting them to these ovens before the quartz lamp infrared generators 150 are turned on. As explained above, all of these fans must be energized to complete the circuit to relay CR9.

Contact CR11B in branch circuit 398 is closed when the relay CR11 in branch circuit 396 is energized at the end of the purge period, simultaneously conditioning branch circuit 398 and the conveyor drive circuit.

With the contacts in branch circuit 398 closed through the sequence described above, the infrared quartz lamps 150 in infrared panels 130 can be turned on at low heat by manually closing infrared generator on-off switch 400 in branch circuit 398, energizing relay CR5 and lighting signal lamps PL5 and PL6 which are connected in parallel with the relay. One of these two signal lamps is located at each of the two sections of the coating apparatus and indicates, to the operator, that the infrared lamps 150 have been turned on.

Energization of relay CR5 (see FIGURES 22B and 22C) also closes contacts CR5C, CR5D, CR5E, and CR5F which are interposed in the circuits controlling the operation of the infrared lamps 150 in infrared ovens 110, 114, 120, and 122, respectively, and which must be closed to energize these lamps.

Specifically, relay contact CR5A is incorporated in a branch circuit 402 connected in parallel with branch circuit 398. As shown in FIGURE 22B, lead 402 is connected to main control circuit lead 328 and to branch lead 398 between relay contacts CR9A and CR11B. In series with relay contact CR5A in lead 402 are the normally closed contact of a relay CR6 which is energized and opens its contact CR6A when the conveyor reaches operating speed and a green pilot lamp 403 which, when lit, indicates that the infrared generators 150 are operating at low heat.

Connected to control circuit main lead 328 in parallel with branch lead 402 is a branch circuit 104 in which the motor of a timer T2 and its normally closed contact T2A are connected in series. Timer T2 is provided to automatically turn off infrared generators 150 if the conveyor drive does not reach normal operating speed within a predetermined time after the infrared generators are turned on. Specifically, with purge timer T1 having completed its purging cycle to close contact T1C, with relays CR12 and CR9 energized so that contacts CR12F and CR9A are closed, and with relay CR6 deenergized so that contact CR6A is closed, timer T2 is energized and starts to run through its timing cycle which may be of any desired duration: for example, one-half hour. If the conveyor has not reached its normal operating speed at the end of the allotted time, timer T2 will complete its timing cycle, opening contact T2A in branch lead 404 to stop the timer motor, and opening normally closed contact T2B in branch circuit 396, deenergizing relay CR11 and causing the latter to open its then closed contact CR11B in branch circuit 398. Opening of the latter contact interrupts the circuit to and deenergizes relay CR5 in branch circuit 398, causing the latter to open its contacts CR5A in branch circuit 402, CR5B in branch circuit 410, and CR5C–CR5F (which, as explained above, must respectively be closed for operation of the quartz lamp infrared generators 150), turning off the quartz lamps.

If the conveyor is started and reaches operating speed within the allotted time, normally closed contact CR6A will be opened by the energization of relay CR6, interrupting the circuit to and stopping timer motor T2 so that the latter will not reach the end of its timing cycle; and contact T2A will remain closed.

The relay CR6 by which relay contact CR6A is controlled is in branch circuit 410 which extends between control circuit main leads 326 and 328, and is connected in series with a normally open, conveyor operated contact RR and relay contact CR5B. Relay contact CR5B is closed by the energization of relay CR5 through the sequence of steps as described above. Contact RR is closed when the conveyor drive has attained its normal operating speed (see FIGURE 24). With these two contacts closed, relay CR6 is energized, opening its contact CR6A and deenergizing timer motor T2, as described above. A green signal lamp 411 connected in parallel with relay CR6 indicates to the operator that the conveyor reached operating speed before timer T2 completed its timing cycle and that the quartz lamp infrared generators 150 have therefore not been turned off. Relay CR6 must be energized for higher full heat operation of infrared generators 150; and insures that the generators are not operated at full heat until web 102 is moving through the coating apparatus at normal speed. Specifically, relay CR6 is energized when contacts RR and CR5B are both closed.

Energization of relay CR6 also causes it to close its normally open contacts CR6B–CR6F. Closing of contacts CR6B–CR6E switches quartz lamp infrared generators 150 from low heat to high heat; and the closing of contact CR6F connects the upper ends of the pneumatic motor cylinders 197 to the compressed air source, causing pneumatic motors 187 to pivot heater panels 130 to the normal operative position in which their lower open faces are parallel to web 102.

The control circuits 412 and 414 for the quartz lamp infrared generators 150 in the first infrared predry oven 110 which are completed by the closing of relay contacts CR5C and CR6B which are substantially identical to those in the other three infrared ovens 114, 120, and 122. Therefore, only the former control circuits will be described in detail, it being understood that this description is equally applicable to the control circuits for the other three ovens.

Referring now to FIGURE 22B, the two control circuits 412 and 414 are connected in parallel between control circuit main leads 326 and 328. With both of these circuits interrupted, as shown in FIGURE 22B, lamps 150 in oven 110 are turned off. With circuit 412 completed, the lamps operate at low heat; and with both circuits 412 and 414 completed, lamps 150 operate at full heat. Four branch circuits 412A–412D are connected in parallel with each other and with branch circuit 412; and four branch circuits 414A–414D are connected in parallel with each other and with circuit 414. Interposed in each of these eight branch circuits 412A–412D and 414A–414D is an infrared generator controlling relay 1C1–1C8. As discussed above under the heading INFRARED GENERATOR CONTROL CIRCUIT, each of these eight relays 1C1–1C8 has three contacts which are interposed in the leads between the resistance elements 154 of the quartz lamps and the three power mains Lx, Ly, and Lz (see FIGURE 19). For example, relay 1C1 has contacts 1C1A, 1C1B, and 1C1C, as shown in FIGURE 19.

When relay CR5 is energized through the sequence of steps described above, closing its contact CR5C in circuit 412, relays 1C1, 1C3, 1C5, and 1C7 are energized. Referring now to both FIGURES 19 and 22B, energization of these four relays closes the twelve normally open relay contacts 1C1A–1C1C, 1C3A–1C3C, 1C5A–1C5C, and 1C7A–1C7C. As discussed in the above-mentioned section, this connects groups of four lamps in series across two of the three main power leads Lx, Ly, and Lz and the lamps have a low heat output.

Energization of "full heat" relay CR6 in circuit 410 closes its contact CR6B in circuit 414 as described above, completing circuit 414 and energizing infrared generator controlling relays 1C2, 1C4, 1C6, and 1C8 and closing relay contacts 1C2A–1C2C, 1C4A–1C4C, 1C6A–1C6C and 1C8A–1C8C. All 24 of the lamp controlling relay contacts are closed at this point in the operation sequence; and, as discussed in the INFRARED GENERATOR POWER CIRCUIT section; lamps 150 are connected in groups of two across power mains Lx, Ly, and Lz and produce full heat.

In the normal automatic sequence of operation, the quartz lamp infrared generators 150 in the first infrared predrying oven 110 are first energized to "half-heat" and then to "full heat." However, it may be desirable, in particular applications, to maintain the lamps on low heat; and, in some circumstances, it may even be desirable to turn the lamps off altogether in a particular one of the four ovens or in particular zones of one or more ovens. For this purpose, four manually operable three position switches 416A–D having "off," "low heat," and "full heat" positions are employed (in the foregoing description of the manner in which lamps 150 are automatically turned on, it has been assumed that this switch was in the "full heat" position). With switch 416A, for example, in the off position, the continuity in circuits 412A and 414A is interrupted, relays 1C1 and 1C2 are deenergized, relay contacts 1C1A–C and 1C2A–C are open, and the lamps in zone 1 of oven 110 are off. When switch 416A is moved to the "low heat" position, continuity is established in circuit 412A only, energizing relay 1C1 and closing its contacts 1C1A–C. This connects the four lamps in zone 1 of oven 110 in series across two of the main power leads, operating the lamps in this zone at low heat. When switch 416A is moved to the "full heat" position, both circuits 412A and 414A are completed, energizing both relays 1C1 and 1C2, closing all six contacts 1C1A–C and 1C2A–C. This connects the lamps 150 in zone 1 to the power mains Lx, Ly, and Lz in series in groups of two, and these lamps produce full heat. The operation of the lamps 150 in the other three zones 2, 3, and 4 of oven 110 may be similarly controlled by manual manipulation of switches 416B–D.

Connected in parallel with each of the lamp controlling relays 1C1–1C8 is a green signal lamp 415A–G which is energized at the same time as the corresponding relay, affording the operator of the coating apparatus an indication of the pattern of heat emission and distribution from the lamps 150 in oven 110.

Connected in parallel with circuit 412 and branch circuits 412A–D is a branch circuit 412E including a relay CR2. Relay CR2, which is therefore energized when relay contact CR5C in circuit 412 is closed, controls a timer T3 (see FIGURE 22C) which controls the movement of the panels 130 in heater frame 132 in oven 110 from the dotted line position of FIGURE 11 where the quartz lamps 150 direct the heat they emit away from web 102 to the normal operative position shown in full lines in the same figure in which the lower open faces of the panels are parallel to web 102 and the quartz lamps direct their emitted radiation onto the web. The infrared generator control circuit in each of the other three ovens includes a relay CR3, CR7, or CR8 which operates a timer TR4, TR5, or TR6 controlling the movement to the operative position of the heater panels 130 in ovens 114, 120 and 122.

The circuitry by which timers T3–T6 control the movement of panels 130 to the operative position is shown in FIGURES 22C and 23. Since the panel controlling circuitry of the four ovens is identical, only that of oven 110 will be described, it being understood that this description is also applicable to the other three ovens.

Referring first to FIGURE 22C, relay CR2 has a contact CR2A interposed in a branch circuit 418A connected between control circuit main leads 326 and 328 through lead 418. Connected in branch circuit 418A in series with contact CR2A are normally open relay contact CR6F and the motor and normally closed contact T3A of timer T3. (Timers T4–T6 are similarly connected to main control leads 326 and 328 by branch circuits 418B–D.) As indicated above, relay CR2 is energized and its normally open contact CR2A closed when relay CR5 is energized to complete circuit 412. Contact CR6F is interposed in the circuit to insure that the panels 130 are not rotated to their normal operative positions until the conveyor drive is operating, it being remembered that the conveyor movement control contact RR is connected in series with relay CR6 in circuit 410 so that relay CR6 cannot be energized until the conveyor drive is operating. When contact CR6F closes, continuity is established in branch circuit 418 and the motor of timer T3 is energized and runs through its timing cycle.

It will be remembered that the movement of the panels 130 to their operative position is accomplished by admitting compressed air to the upper end of the cylinder 197 of a pneumatic motor 187, connection of the upper end of the cylinder to the compressed air source being accomplished by energizing a four-way solenoid valve 200 (see FIGURE 11). A pneumatic motor 187 is provided for each of the four heater panels supporting frames 132 in oven 110, one of the heater panel supporting frames 132 being located in each of the four zones 1, 2, 3, and 4 of this oven.

The solenoid operators of the four-way valves are shown in FIGURE 23 and are identified by reference characters SA, SB, SC, and SD. These operators are associated, respectively, with the pneumatic motors 187 controlling the heater frames 132 in zones 1, 2, 3, and 4 of oven 110.

The circuitry through which solenoids SA–SD are controlled by timer T3 is shown in FIGURES 19 and 23. Referring now to these figures and to FIGURE 22C, leads 334 and 336 of the solenoid valve control circuit are connected through fuses 338 and 340 to control circuit main leads 326 and 328 so that 115 volt, single phase, 60 cycle power is applied to leads 334 and 336. Connected in parallel between leads 334 and 336 are four branch circuits HF1L–HF4L in which the four solenoids SA–SD are incorporated in series with normally open contacts T3B, T3C, T3D, and T3E of timer T3. Timer T3 is typically set so that, when its motor is energized to start the timing cycle, it will close contact T3B at once, contact T3C in eight seconds, contact T3D in eighteen seconds, and contact T3E in twenty-eight seconds. Therefore, the contacts T3B–T3E will be successively closed and the four solenoids SA–SD successively energized so that operating fluid will be supplied to the four pneumatic motors 187 in zones 1, 2, 3, and 4 of oven 110 in succession. Accordingly, the heater panels 130 of zone 1 will first be rotated to the normal operative position followed by, successively, rotation to their operative positions of the panels 130 in zones 2, 3, and 4. Timers T4, T5, and T6 are similarly set to successively move the several panels in each of the other three infrared ovens 114, 120 and 122 to their operative positions. For example, the timer T4 controlling panels 130 of the first infrared fusing oven 114 may typically be set to close contact T4B in five seconds, contact T4C in fifteen seconds and contact T4D in twenty-five seconds. The timer T5 controlling panels 130 in the second infrared predrying oven would then typically be set to close contact T5B in five seconds, contact T5C in fifteen seconds, and contact T5D in twenty-six seconds; and the timer T6 controlling the movement of panels 130 in the second infrared fusing oven 122 to close contact T6B in nine seconds, contact T6C in sixteen seconds, contact T6D in twenty-one seconds, and contact T6E in twenty-seven seconds. These times, however, are not to be regarded as critical and may be varied as desired.

In addition to the components just described, the coating apparatus controls include circuitry for shutting down the coating apparatus and/or alerting the operator if the apparatus malfunctions. The first of these components is relay CR4 which, as mentioned above, is deenergized if a predetermined temperature is exceeded in any of the four infrared ovens 110, 114, 120, or 122.

Specifically, referring to FIGURE 22B, four high temperature limit switches HTL1–HTL4 are connected in series with relay CR4 in branch circuit 406. Each of these high temperature limit switches, which may be of any desired conventional construction, is located in one of the four infrared ovens 110, 114, 120, and 122. Since the four limit switches are connected in series, if any of the four ovens exceeds the predetermined high temperature, the associated limit switch will open, deenergizing relay CR4 and cutting off the quartz lamp infrared generators 150 in all four ovens 110, 114, 120, and 122.

Deenergization of relay CR4 opens its normally open contact CR4A in branch circuit 392, interrupting the application of operating voltage to relay CR5 which is in branch circuit 398 and connected in series with contact CR4A. Deenergization of relay CR5 opens its normally open contact CR5C in branch circuit 412 and its normally open contact CR5B in branch circuit 410 which deenergizes relay CR6, opening its normally open contact CR6B in branch circuit 414. As explained above, with the continuity of branch circuits 412 and 414 interrupted, the infrared generators 150 in the first infrared predrying oven 110 are turned off. The circuits to the other three infrared ovens 114, 120, and 122, as indicated above, are identical to those of oven 110 and, therefore, deenergization of relay CR4 also turns off the quartz lamp infrared generators in these three ovens.

Connected between control circuit main leads 326 and 328 is a branch circuit 408 in which a normally closed contact CR4B of relay CR4 is connected in series with a red signal lamp 409. As long as relay CR4 is energized, contact CR4B is open and lamp 409 is off. However, if relay CR4 is deenergized by the presence of an excessive high temperature in one of the four infrared ovens, relay contact CR4B will close, lighting lamp 409 and warning the operator of the overtemperature condition.

Occasionally, one or more of the contacts shown in FIGURE 20, which control the connection of the resistance elements of quartz lamp infrared generators 150 to power mains Lx, Ly and Lz, may stick or arc. An alarm system is preferably provided to warn the operator of such an occurrence. This alarm system includes four identical alarm circuits, one in each of the four infrared ovens 110, 114, 120, and 122. Therefore, only the alarm circuit of oven 110 will be described, it being understood that this description is equally applicable to the alarm circuits of the other three ovens.

Figure 22D:
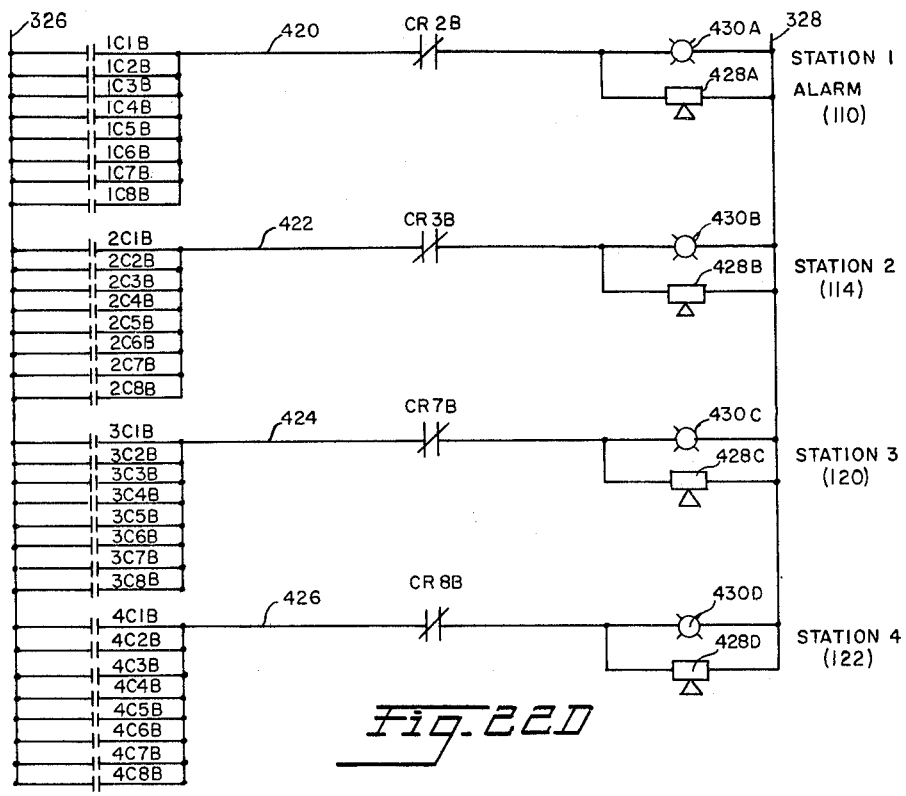

Referring now to FIGURE 22D, the alarm circuit 420 of oven 110 is connected between control circuit main leads 326 and 328 and includes a red signal lamp 430A and a horn 428A which are connected in parallel with each other and in series with a normally closed contact CR2B of the panel movement controlling relay CR2 described above. Therefore, if one of the relay contacts in oven 110 (only a few of which are shown in FIGURE 22D) sticks or freezes when relay CR2 is deenergized, continuity will be established in circuit 420, and light 430A will light and horn 428A sound.

As discussed above, relay CR2 is energized and deenergized concurrently with the turning on and off of the quartz lamps 150 in oven 110 by the completion and interruption of branch circuit 412. With the lamps turned on, part or all of the relay contacts in oven 110 will normally be closed. Under these conditions relay CR2 will be energized, and its normally closed contact CR2B open so that branch circuit 420 will not light the signal lamp or sound horn 428A. However, when the infrared lamps are turned off, relay CR2 will be deenergized and contact CR2B will close. If, at this time, one of the relay contacts in oven 110 is stuck or arcs, continuity will be established in branch circuit 420, lighting the signal lamp and sounding the horn.

The warning circuits 422, 424, and 426 illustrated in FIGURE 22D are located, respectively, in infrared ovens 114, 120, and 122; and, as indicated above, are identical to the warning circuit just described.

CONVEYOR DRIVE

As discussed above, web 102 is moved through the coating apparatus on rollers 104, all or some of which must be driven to cause movement of the web. To adapt the coating apparatus provided by the present invention for use with different coating materials and processes, provision is made for varying the speed at which web 102 travels. In addition, for safety, the movement of driven rollers 104 must be interlocked with the operation of the quartz lamp infrared generators 150 to insure that web 102 is moving before the infrared generators are turned on. A novel conveyor drive, provided by the present invention for accomplishing these objectives, is shown in FIGURE 24.

Turning now to this figure, the conveyor drive includes a motor generator set 504 connected by leads 501A–501C to a control box 502 which, in turn, is connected through a fused disconnect switch 500 to the three power mains L1, L2, and L3. Control box 502 houses a control for starting and stopping the motor of motor generator set 504. Controls of this type are well known and any desired type may be employed. Since the details of this control form no part of the present invention, it will not be described herein.

Referring now to both FIGURES 19 and 24, the generator of motor generator set 504 is connected to a conventional exciter 509 which, in turn, is connected by fused leads 342 and 344 to leads 334 and 336 which, it will be remembered, carry 115 volt A.C. power.

Motor generator set 504 is employed to convert the three-phase A.C. power to direct current. The output of the generator of motor generator set 504 is leads 505 and 508 to which two sets of branch leads 510, 512 and 514, 516 are connected. Leads 514 and 516 are connected to a D.C. motor 526 which drives one or more of the rollers 104 in the conveyor line 100 of the coating apparatus illustrated in FIGURE 1. Leads 510 and 512 are employed to drive the conveyor line of a second coating apparatus or, if unnecessary, may be omitted.

Normally open relay contact CR11C, manually operable switch NS, and motor speed control box 524 are connected in the lead 514 to motor 526; and a manually operated switch ES is interposed in motor lead 516. As discussed above, normally open relay contact CR11C is closed by the energization of relay CR11 which occurs at the end of the purge cycle provided to remove flammable vapors from infrared ovens 110, 114, 120, and 122 and insures that the conveyor drive is not started and quartz lamp infrared generators 150 turned on before the purge cycle is completed. Switches NS and ES are, respectively, a "normal stop" switch and an "emergency stop" switch, either of which may be opened to stop conveyor line 100 and both of which must be closed to start it.

Control 524 is employed to vary the speed of motor 526. Any of a number of well known types of D.C. motor controls may be employed. A number of suitable types are described on pages 1972–1975, Mark's Mechanical Engineers' Handbook (5th edition).

Motor 526 is drive connected to rollers 104 of conveyor line 100 in any suitable manner, such as by the belt 532 illustrated in FIGURE 24. It is to be understood, however, that belt 532 is merely representative and that, in actual practice, the drive train connecting rollers 104 and motor 526 will generally be more complicated and may include components other than or in addition to a belt.

Referring now to FIGURES 22B and 24, the conveyor just described is interlocked with the infrared generators 150 in infrared ovens 110, 114, 120, and 122 by a relay 522 connected by branch leads 518 and 520 across the leads 514 and 516 supplying operating current to D.C. motor 526. Relay 522 includes the normally open contact 2N in series in branch circuit 398 with infrared generator on-off switch 400 and relay CR5. As discussed above, circuit 398 cannot be completed to turn on the infrared generators 150 in infrared ovens 110, 114, 120, and 122 until contact 2N is closed. Contact 2N is closed by the energization of relay 522 which (assuming that there is continuity in leads 514 and 516) occurs only when motor generator set 504 is running and applying operating voltage to the conveyor line drive motor 526. Thus, the conveyor drive cannot be started and infrared generators 150 cannot be turned on until operating voltage is available at conveyor drive motor 526 since branch circuit 398 cannot be completed to energize relay CR5 until operating voltage is available at motor 526.

The conveyor drive and infrared generators 150 are also interlocked by a speed sensing device 534 which may be, for example, a small generator, drive connected to conveyor drive motor 526 by connecting linkage indicated diagrammatically in FIGURE 24 by reference character 537. When motor 526 is operating at normal speeds, it drives generator 534 at a rate at which it has a sufficiently high output to energize relay 536 to which it is connected by leads L538A and L538B. Upon being energized, relay 536 closes its contact RR which (see FIGURE 22B) is wired in branch circuit 410 in series with relay CR6 which, as discussed above, must be energized before the quartz lamp infrared generators 150 in infrared ovens 110, 114, 120, and 122 can provide their maximum or full heat output. Thus, the speed sensing device just described insures that web 102 is moving through the coating apparatus at a normal speed before the four infrared ovens through which it passes are on "full" heat.

The other three infrared ovens 114, 120, and 122 are also controlled in the manner just described to insure that the infrared generators 150 in these three ovens do not go to "full" heat before conveyor line 100 is operating at normal speeds.

As far as the practice of the present invention is concerned, the only thing important about the conveyor drive illustrated in FIGURE 24 is its interconnection with the oven control circuit of FIGURES 19, 22A, 22B, 22C, 22D, and 23. It will be understood, therefore, that other forms of conveyor drives may be substituted for the illustrated form just described, if desired.

CONTROL PANEL

The transformers, relays, switches, pilot lamps, and timers not incorporated in the infrared ovens themselves are housed in the control panel box 450 illustrated in FIGURE 25. Meters, selector switches, push buttons, pilot lights, and other controls which must be accessible to the operator are mounted in four panels 450a–450d, one for each of the four infrared ovens 110, 114, 120, and 122, on the face of the panel box. Other control components such as transformers, relays, and the like are housed in panel box 450. Prefabricated wiring harnesses are preferably employed to facilitate installation of the circuit components.

OPERATION

The operation of the novel coating apparatus provided by the present invention has been described in detail above. Briefly, the startup-sequence for the coating apparatus is as follows, it being assumed that a polyvinylidene chloride dispersion or other coating material with a non-flammable liquid carrier is being employed:

(1) Selector switch 380 (see FIGURE 22A) is turned to the illustrated "purge" position.

(2) Purge button 386 (also shown in FIGURE 22A) is closed.

(3) The supply and exhaust fans of the various infrared ovens and convection drying oven 112 are started by closing the switches 336a–336l illustrated in FIGURE 22A.

(4) When the purge cycle is completed, the red purge light 393 (see FIGURE 22B) is automatically extinguished and selector switch 380 is then turned to its alternate position and exhaust fan 112C, which is employed only during the purge cycle and when the coating material has a flammable liquid carrier, is turned off.

(5) The infrared generator on-off switch 400 (see FIGURE 22B) is closed. At this point conveyor motor 526 is already running since the contact CR11C in lead 514 was closed by the energization of relay CR11 at the end of the purge cycle. Therefore, contact 2N in branch circuit 389 (see FIGURE 22B) is closed and, when switch 400 is closed, the "low heat" circuits to the infrared generators 150 in the four infrared ovens 110, 114, 120, and 122 are completed and relays CR2, CR3, CR7, and CR8 are energized, completing circuits to the motors of timers T3–T6.

(6) When conveyor line 100 obtains normal speed contact RR (see FIGURES 22B and 24) closes, and the "full heat" circuits to the infrared generators in the four infrared oven are completed.

(7) Timers T3–T6 actuate solenoids SA–SN, successively energizing pneumatic motors 187 and causing the heater panels 130 in each of the four ovens to be successively moved to their normal operating positions with their open lower faces parallel to web 102.

NORMAL STOP

To stop the coating apparatus, switch NS (see FIGURE 24) is opened, interrupting the circuits to conveyor drive motor 526 which coasts to a stop. When the speed of motor 526 drops below a predetermined minimum, switch RR (see FIGURES 24 and 22B) opens, deenergizing relay CR6, which cuts the infrared generators to "low heat" and deenergizes timers T3–T6. When the timers are deenergized, their contacts T3B–T3E, T4B–T4D, T5B–T5D, and T6B–T6E (see FIGURE 23) open, deenergizing pneumatic motor controlling solenoids SA–SN. When the foregoing solenoids are deenergized, the lower ends of the cylinders 197 of pneumatic motors 187 are connected to the compressed air source. The compressed air drives pistons 196 upwardly, rotating heater panels 130 from their normal operative positions to the positions shown in dotted lines in FIGURE 11 in which the heat emitted from quartz lamps 150 is directed away from web 102. This is an important safety feature of the present invention since there is a substantial amount of residual heat emitted from quartz lamps 150 after they are turned off; and the automatic pivotal movement of panels 130 to inoperative positions prevents web 102 from being overheated.

Infrared on-off switch 400 may be opened if the coating apparatus is to be shut down, although it is not necessary to do so between runs.

EMERGENCY STOP

In the case of an emergency such as the breaking of web 102, "emergency stop" switch ES is opened. This cuts off power to conveyor drive motor 526 and deenergizes relay 522, causing its contact 2N to open. This deenergizes relays CR5 and CR6 (see FIGURE 22B), cutting off the power to quartz lamp infrared generators 150 and connecting the lower ends of cylinders 197 of pneumatic motors 187 to the compressed air source, causing them to turn infrared panels 130 so that the residual heat emitted from quartz lamps 150 will be directed away from web 102.

"SINGLE COAT" COATING APPARATUS

The coating apparatus just described is specifically designed to apply two layers or coats of coating material to web 102. A single coat may be applied by taking web 102 off the coating apparatus after is passes over the first chill roll 116. However, if only single layers of the coating material are to be applied, it will prove more economical to employ coating apparatus in accordance with the principles of the present invention specifically designed for the application of a single coat of coating material. Coating apparatus of this type is illustrated in FIGURES 26–32.

Referring now to the latter figures, the "single-coat" coating apparatus includes an arched line 630 through which a web 634 of the material to be coated is conveyed on rollers 632 which may be driven in the same manner as the rollers 104 of conveyor line 100 of the "two-coat" coating apparatus illustrated in FIGURE 1 and described above.

In the coating apparatus of FIGURE 26, web 634 is drawn from a roll 636 through a coating station 638 where, for example, a water dispersion of polyvinylidene chloride is applied to its upper side. In one application of the coating apparatus of FIGURE 26, this dispersion consists of equal parts of polyvinylidene chloride and water, the web is 32 inches wide and moves through coating station 638 at a speed of 600 feet per minute, and 520 pounds per hour of the polyvinylidene chloride is applied to the web.

From coating station 638, web 634 passes, seriatim, through infrared predrying oven 640, convection drying oven 642, infrared fusing oven 644, over chill roll 646 and to a station where it is rewound into a roll 648.

Approximately 20% of the water added to web 634 in coating station 638 is evaporated in infrared predrying oven 640. Infrared predrying oven 640, which is provided with a ventilating system including 1000 c.f.m. supply fan 654 (see FIGURES 27 and 28) driven by a motor 654a, filter 654b, air supply ducts 654c, 3500 c.f.m. exhaust fan 656 driven by motor 656a, exhaust ducts 656b, and discharge pipe 656c, is identical to the infrared predrying oven 110 described above with the exception of the number of quartz lamp infrared generators 150. Oven 640 has thirteen infrared heating panels 658 (identical to heating panels 130 described above), each of which contains four quartz lamp infrared generators. Panels 658 are supported in heater frame 662, identical to heater frames 132. Heater frames 662 (also identified as HF1A–HF3A) respectively support 3, 4, and 6 panels.

As indicated above in conjunction with the "two-coat" coating apparatus, the convection drying oven into which the coated and partially dried web passes from the infrared predrying oven may be of any desired construction and forms no part of the present invention. This is also true of the convection drying oven 642 employed in the coating apparatus of FIGURES 26–32. Generally speaking, this oven comprises a long tunnel surrounding web 634 through which air heated to a temperature not above 200° F. is blown to evaporate the coating material's liquid carrier from the web. As illustrated, oven 642 is provided with an air supply and exhaust system including motor driven supply fans 642d and 642e which force fresh air through an inlet 642a, ducts 642b and 642c and over steam heated coils in air heaters 642f and 642g. The air then passes through ducts 642h and 642i into the oven.

If the particular coating material being employed has a non-flammable liquid carrier, the evolved vapors are exhausted from oven 642 by motor driven fan 645a through stack 645b. If the liquid carrier is flammable, motor driven fan 645c is also employed to provide additional exhaust through stack 645d.

Infrared fusing oven 644 through which web 634 passes from convection drying oven 642 is virtually identical to infrared predrying oven 640 and to the infrared ovens of the "two-coat" coating apparatus of FIGURE 1 except that it has eleven heater panels 658, three in heater frame HF4A, four in heater frame HF5A, and four in heater frame HF6A. Infrared fusing oven 644 is also provided with a ventilating system including a 1000 c.f.m. air supply fan 674 and a 2000 c.f.m. exhaust fan 676.

In infrared fusing oven 644, the coated and dried web 634 is exposed to short to intermediate wave length infrared radiation (preferably having a wave length ranging from 2 to 6 microns) for about two seconds which is sufficient to fuse the dried coating of polyvinylidene chloride and bond it to web 634 without damaging the web.

The coating apparatus of FIGURES 26–32 is preferably provided with a control system which may be virtually identical to that described above in conjunction with the "two-coat" coating apparatus of FIGURE 1. Further elaboration of this control system is therefore not believed to be required.

As indicated above, the coated web passes from infrared fusing oven 644 over a chill roll 646. The chill roll is preferably cooled by circulating water through it at a temperature of about 50° F. The chill roll solidifies the fused coating material on web 634, which permits it to be rewound into roll 648.

The principles of the present invention may be also applied to the design of coating apparatus for applying even more than two coats of coating material to a web. The present invention is intended to cover such modifications of the illustrated coating apparatus as well as the modifications, for example, where the web is turned over or reversed before the application of the second coat of coating material in the "two-coat" coating apparatus of FIGURE 1 so that both sides of the web are coated.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by Letters Patent is:

1. Apparatus for coating bases of paper and other material to which the coating is applied in a liquid carrier, comprising:
    (a) first infrared heating means for evaporating a portion of the liquid carrier from the base;
    (b) convection heating means for evaporating the remainder of the liquid carrier from the base;
    (c) second infrared heating means for thereafter heating and fusing the coating material and thereby bonding it to the base;
    (d) means for conveying said base seriatim through said first infrared heating means, said convection heating means, and said second infrared heating means; and
    (e) said first and second heating means each comprising:
        (1) a plurality of heating elements; and
        (2) means for adjusting the distance between said heating elements and the path along which said base is moved by said conveyor means.

2. The coating apparatus as defined in claim 1, together with means for turning off said first and second heating means when said conveyor is stopped.

3. The coating apparatus as defined in claim 1, together with means for preventing said first and second infrared heating means from being operated until said conveyor means is operating.

4. The coating apparatus as defined in claim 1, together with means controlled by said conveyor means for operating said first and second infrared heating means to provide a reduced heat output until said conveyor means reaches a predetermined speed.

5. Apparatus for coating bases of paper and other material to which the coating is applied in a liquid carrier, comprising:
    (a) first infrared heating means for evaporating a portion of the liquid carrier from the base;
    (b) convection heating means for evaporating the remainder of the liquid carrier from the base; and
    (c) second infrared heating means for thereafter heating and fusing the coating material and thereby bonding it to the base;
    (d) said convection heating means including:
        (1) two independent exhaust systems; and
        (2) means for operating one of said systems if the liquid carrier is nonflammable and both of said exhaust systems if the liquid carrier is flammable.

6. The coating apparatus as defined in claim 5, together with control means including means for locking out said first and second infrared heating means, whereby they may be used with said coating apparatus coating materials having flammable liquid carriers.

7. Apparatus for coating bases of paper and other material to which the coating is applied in a liquid carrier, comprising:
    (a) first infrared heating means for evaporating a portion of the liquid carrier from the base;
    (b) convection heating means for evaporating the remainder of the liquid carrier from the base;
    (c) second infrared heating means for thereafter heating and fusing the coating material and thereby bonding it to the base;
    (d) means for conveying said base seriatim through said first infrared heating means, said convection heating means, and said second infrared heating means;
    (e) said first and second heating means comprising heating elements movable with respect to the path along which said base is conveyed by said conveyor means; and
    (f) means for automatically moving said heating elements to positions in which heat emitted therefrom is directed away from said base when said conveyor is stopped.

8. The coating apparatus as defined in claim 7:
    (a) wherein the heating elements of both the first and second infrared heating means are arranged in a generally planar array; and
    (b) each of said heating means includes means for moving said elements to a position closely spaced from and generally parallel to the path along which said base is moved when said conveyor means is started.

9. The coating apparatus as defined in claim 7, wherein said first and second infrared heating means each comprise:
    a means for selectively activating predetermined ones of said heating elements, whereby the heat distribution pattern of the heating means may be selectively varied.

10. Apparatus for coating bases of paper and other material to which the coating is applied in a liquid carrier, comprising:
    (a) first infrared heating means for evaporating a portion of the liquid carrier from the base;
    (b) convection heating means for evaporating the remainder of the liquid carrier from the base;
    (c) second infrared heating means for theerafter heating and fusing the coating material and thereby bonding it to the base; and
    (d) a constant voltage electrical power source;
    (e) said first and second means each comprising:
        (1) a plurality of resistance type heating elements, and
        (2) means for selectively connecting said elements in groups of varying numbers and across said power source, whereby the voltage drop across and thereby the heat output of said resistance elements may be selectively altered.

References Cited

UNITED STATES PATENTS

| | | | |
|---|---|---|---|
| 2,732,883 | 1/1956 | Morrison et al. | 34—41 X |
| 3,150,864 | 9/1964 | Fetner et al. | 34—4 |
| 3,228,113 | 1/1966 | Fannon | 34—39 |
| 3,254,422 | 6/1966 | Defiel | 34—155 |
| 3,364,062 | 1/1968 | Mitchell et al. | 34—4 |

(Other references on following page)

UNITED STATES PATENTS

| | | | |
|---|---|---|---|
| 3,370,359 | 2/1968 | Beechler | 34—155 |
| 2,923,640 | 2/1960 | Buckingham | 117—64 |
| 3,034,926 | 5/1962 | Carter et al. | 118—643 |
| 3,068,119 | 12/1962 | Gotsch | 118—642 |
| 3,166,435 | 1/1965 | Meier | 117—119.6 |
| 3,215,115 | 11/1965 | Knight et al. | 181—5 |
| 3,220,377 | 11/1965 | Good | 118—11 |

LLOYD L. KING, Primary Examiner

U.S. Cl. X.R.

34—4, 155

UNITED STATES PATENT OFFICE
CERTIFICATE OF CORRECTION

Patent No. 3,499,231                          March 10, 1970

Thomas F. Mullaney

It is certified that error appears in the above identified patent and that said Letters Patent are hereby corrected as shown below:

Column 1, line 69, "miximum" should read -- maximum --. Column 6, line 39, "over" should read -- oven --; line 56, "is" should read -- in --. Column 7, line 56, "of", first occurrence, should read -- is --. Column 8, line 42, "track" should read -- tack --. Column 13, line 30, cancel the "." after 150; same line, "2Y$^\alpha$" should read -- 2Ya --; line 36, "in" should read -- is --. Column 14, line 37, "fuses 300 and 132." should read -- fuses 330 and 332 --. Column 18, line 7, "366e" should read -- 3661 --; line 19, "CRiA" should read -- CR10A --; line 56, "ESIS" should read -- EX1S -. Column 19, line 15, "cirrcuit" should read -- circuit --. Column 20, line 32, "104" should read -- 404 --. Column 26, line 62, "336a - 3361" should read -- 366a - 3661 --; line 75, "389" should read 398 --. Column 27, line 8, "oven" should read -- ovens --.

Signed and sealed this 25th day of August 1970.

(SEAL)
Attest:

EDWARD M. FLETCHER, JR.
Attesting Officer

WILLIAM E. SCHUYLER, JR.
Commissioner of Patents